(12) United States Patent
Sharifi et al.

(10) Patent No.: US 11,521,597 B2
(45) Date of Patent: Dec. 6, 2022

(54) CORRECTING SPEECH MISRECOGNITION OF SPOKEN UTTERANCES

(71) Applicant: Google LLC, Mountain View, CA (US)

(72) Inventors: Matthew Sharifi, Kilchberg (CH); Victor Carbune, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 166 days.

(21) Appl. No.: 17/011,606

(22) Filed: Sep. 3, 2020

(65) Prior Publication Data

US 2022/0068261 A1   Mar. 3, 2022

(51) Int. Cl.
| | | |
|---|---|---|
| *G10L 15/00* | (2013.01) | |
| *G10L 15/08* | (2006.01) | |
| *G06F 3/16* | (2006.01) | |
| *G10L 13/02* | (2013.01) | |

(52) U.S. Cl.
CPC ............... *G10L 15/08* (2013.01); *G06F 3/16* (2013.01); *G10L 13/02* (2013.01); *G10L 2015/088* (2013.01)

(58) Field of Classification Search
CPC ... G10L 15/08; G10L 13/02; G10L 2015/088; G10L 15/22; G10L 2015/225; G10L 2015/221; G10L 15/01; G10L 21/10; G10L 21/06; G10L 21/16; G10L 21/18; G06F 3/16; G06F 3/167; G06F 40/226; G06F 40/30
See application file for complete search history.

(56) References Cited

U.S. PATENT DOCUMENTS

| | | | | |
|---|---|---|---|---|
| 9,653,073 | B2 * | 5/2017 | VanBlon | G10L 15/08 |
| 9,953,637 | B1 * | 4/2018 | Di Fabbrizio | G10L 15/22 |
| 2007/0208567 | A1 * | 9/2007 | Amento | G10L 15/22 |
| | | | | 704/E15.04 |
| 2015/0149163 | A1 | 5/2015 | VanBlon et al. | |
| 2019/0206393 | A1 * | 7/2019 | Fang | G10L 15/1815 |

FOREIGN PATENT DOCUMENTS

| | | | | |
|---|---|---|---|---|
| WO | WO-2006016308 | A1 * | 2/2006 | G10L 15/22 |
| WO | WO-2018048620 | A1 * | 3/2018 | G06F 17/2785 |

OTHER PUBLICATIONS

European Patent Office; International Search Report and Written Opinion of Ser. No. PCT/US2020/064951; 10 pages; dated May 18, 2021.

* cited by examiner

*Primary Examiner* — Edgar X Guerra-Erazo
*Assistant Examiner* — Parker Mayfield
(74) *Attorney, Agent, or Firm* — Middleton Reutlinger

(57) ABSTRACT

Implementations can receive audio data corresponding to a spoken utterance of a user, process the audio data to generate a plurality of speech hypotheses, determine an action to be performed by an automated assistant based on the speech hypotheses, and cause the computing device to render an indication of the action. In response to the computing device rendering the indication, implementations can receive additional audio data corresponding to an additional spoken utterance of the user, process the additional audio data to determine that a portion of the spoken utterance is similar to an additional portion of the additional spoken utterance, supplant the action with an alternate action, and cause the automated assistant to initiate performance of the alternate action. Some implementations can determine whether to render the indication of the action based on a confidence level associated with the action.

20 Claims, 10 Drawing Sheets

CORRECTING SPEECH MISRECOGNITION OF SPOKEN UTTERANCES

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," etc.). For example, humans (which when they interact with automated assistants may be referred to as "users") may provide commands and/or requests to an automated assistant using spoken natural language input (i.e., spoken utterances), which may in some cases be converted into text and then processed, and/or by providing textual (e.g., typed) natural language input. An automated assistant generally responds to a command or request by providing responsive user interface output (e.g., audible and/or visual user interface output), controlling smart device(s), and/or performing other action(s).

Automated assistants typically rely upon a pipeline of components in interpreting and responding to user requests. For example, an automatic speech recognition (ASR) engine can be used to process audio data that correspond to a spoken utterance, to generate a transcription (i.e., sequence of term(s) and/or other token(s)) of the user's utterance. However, in performing ASR, certain term(s) may be misrecognized. As a result, the automated assistant may perform an action that was not intended by the user. This can cause the user to repeat the same spoken utterance (which may be misrecognized again) or cause the user to perform some other action, thereby prolonging the human-to-computer dialog and/or causing the user to consume additional computational resources beyond the human-to-computer dialog.

SUMMARY

Some implementations disclosed herein relate to identifying and correcting misrecognitions in speech recognition during a human-to-computer dialog session. For example, in response to receiving a spoken utterance of "Play a song by John Doe" from a user of a computing device, an automated assistant can cause speech recognition to be performed on the spoken utterance. In performing speech recognition, multiple term hypotheses can be generated for one or more portions of the speech. This, in turn, results in a plurality of transcription hypotheses being generated. In this example, assume that multiple term hypotheses are generated for the portion of speech corresponding to "Doe", such as "Roe", "Doe", "Row", and "Dough". This results in multiple transcription hypotheses such as "Play a song by John Roe", "Play a song by John Dough", etc. A given transcription hypothesis, of the plurality of transcription hypotheses, can be selected as corresponding to the spoken utterance utilizing one or more techniques. For example, assume that the selected transcription speech hypothesis corresponds to "Play a song by John Roe" (rather than "Doe" as the user intended). The selection of the term hypothesis "Roe" over the term hypothesis "Doe" in this example represents a misrecognition in speech recognition for the given transcription hypothesis. As a result of the misrecognition, the automated assistant can cause a song by "John Roe" (not "John Doe") to begin playing and/or, before the song beings playing can cause a spoken response of "Okay, playing a song by John Roe" to be audibly rendered at the computing device of the user. Further assume, in response to the song being played and/or the spoken response being audibly rendered, an additional spoken utterance of "No, Doe" is received at the computing device and from the user. The automated assistant can process the additional spoken utterance to determine that the additional spoken utterance corrects the misrecognition in speech recognition (e.g., "Doe" instead of "Roe").

As one example, the additional spoken utterance can be processed to determine that the "Doe" portion of the additional spoken utterance is similar to the "Doe" portion of the prior spoken utterance (i.e., that was misrecognized as "Roe"). This similarity determination can include, for example, determining the portions are phonetically similar, acoustically similar, and/or have one or more overlapping term hypotheses from speech recognition. In response, speech recognition that is performed on the additional spoken utterance can be utilized to correct the prior misrecognition, enabling an alternate action of playing a song by "John Doe" (not "Roe") to be performed. As one example, additional term hypotheses for the "Doe" portion of the additional spoken utterance and the term hypotheses for the "Doe" portion of the prior spoken utterance can be considered together to determine that a term hypothesis of "Doe" is common to both (and optionally that corresponding confidence level(s) for both satisfies a threshold) and, in response, use "Doe" to correct the misrecognition of "Roe". As a result, an alternate transcription hypothesis of "Play a song by John Doe" can be utilized to determine the alternate action In some implementations, audio data that captures a spoken utterance can be processed, using speech recognition model(s), locally at a computing device that detected the audio data (e.g., via microphone(s) thereof). In some additional and/or alternative implementations, the audio data (or features derived therefrom) can be transmitted to a remote computing system (e.g., server(s)) over one or more networks, and processed, using the speech recognition model(s), remotely at the remote computing system. In processing the audio data, a plurality of speech hypotheses (including term hypotheses and/or transcription hypotheses) can be generated using the speech recognition model(s) (e.g., as direct output from processing using the speech recognition model(s) and/or by post-processing of such output), and each of the plurality of speech hypotheses can be associated with a respective confidence level corresponding to a likelihood that a given speech hypothesis corresponds to the spoken utterance. A given speech hypothesis, of the plurality of speech hypotheses, can be selected as corresponding to the spoken utterance based on the respective confidence levels. Further, the plurality of speech hypotheses for a given spoken utterance can be stored in memory and/or in one or more databases. For example, assume a spoken utterance of "Play a song by John Doe" is received. In this example, a first transcription hypothesis of "Play a song by John Doe" (including a first term hypothesis of "Doe") can be generated along with first respective confidence level(s) (e.g., associated with the first transcription hypothesis and/or the first term hypothesis), a second transcription hypothesis of "Play a song by John Roe" (including a second term hypothesis of "Roe") can be generated along with second respective confidence level(s) (e.g., associated with the second transcription hypothesis and/or the second term hypothesis), and so on. In some additional and/or alternative versions of those implementations, transcriptions corresponding to one or more of the plurality of transcription hypotheses can also be generated.

Further, the automated assistant can determine an action to be performed based on the given speech hypothesis that is selected as corresponding to the spoken utterance. The action can include, for example, at least an intent of the user and slot values for one or more parameters associated with the intent. For example, assume the given speech hypothesis that is selected as corresponding to the spoken utterance corresponds to "Turn on the bedroom lights". In this example, the action can include the intent of "turn on lights", and a slot value of "bedroom" for a "semantic identifier" parameter. As another example, assume the given speech hypothesis that is selected as corresponding to the spoken utterance corresponds to "Play a song by John Doe". In this example, the action can include the intent of "play a song", and a slot value of "John Doe" for an "artist" parameter (and optionally a slot value for a "song" parameter if a particular song is specified by the user).

Moreover, the automated assistant can optionally cause the computing device to render a spoken response that indicates the action to be performed by the automated assistant via speaker(s) of the computing device. For example, the automated assistant can cause a spoken response of "Ok, playing a song by John Doe" to be audibly rendered in response to receiving a spoken utterance of "Assistant, play a song by John Doe". In implementations where the computing device includes a display, the automated assistant can additionally and/or alternatively cause the computing device to visually render an indication of the action to be performed. For example, the automated assistant can cause the display of the computing device to visually render a transcription of the given speech hypothesis that is selected as corresponding to the spoken utterance, one or more control elements associated with the action to be performed (e.g., music control elements, home automation device control elements, etc.), and/or other visual indications.

In some implementations, additional audio data that corresponds to an additional spoken utterance can be detected via the microphone(s) of the computing device of the user. The additional audio data that corresponds to the additional spoken utterance may be received responsive to audibly rendering the spoken response that indicates the action to be performed by the automated assistant. The additional audio data can optionally be filtered to remove any audio data corresponding to the spoken response if the additional audio data is received while the spoken response is being audibly rendered and/or to remove any other audio data of other humans in the environment (e.g., via voice filtering) or ambient noise.

In some versions of those implementations, in response to determining that the respective confidence level associated with the given speech hypothesis that is selected as corresponding to the spoken utterance fails to satisfy a threshold confidence level, the automated assistant can keep one or more components of the computing device active in anticipation of receiving the additional audio data corresponding to the additional spoken utterance. For example, if the automated assistant determines that the spoken utterance corresponds to the given speech hypothesis of "Play some music by John Roe", but the respective confidence level associated with the given speech hypothesis fails to satisfy the threshold confidence level, then speech recognition can be kept active in anticipation that the user will provide the additional spoken utterance to correct a potential misrecognition. In keeping speech recognition active, certain parameters of the speech recognition may be adapted. For instance, speech recognition may be limited to a voice that corresponds to a user that provided the original spoken utterance (e.g., using voice ID) and/or endpointing of the additional audio data may be restricted to an expected length of any additional spoken utterance that corrects a misrecognition, such as a length of a shortest speech hypothesis, of the plurality of speech hypotheses, to a length of a longest speech hypothesis, of the plurality of speech hypotheses. Moreover, the one or more components may be kept active for a pre-defined period of time (e.g., three seconds, four seconds, and so on), until the automated assistant initiates performance of the action, or for a pre-defined period of time after the automated assistant initiates performance of the action (e.g., two seconds, five seconds, and so on) and/or fully performs the action. This enables the user to more quickly provide the additional spoken utterance without having to prolong the dialog session by again triggering the automated assistant (e.g., using a hotword, a button press, or any other mechanism for invoking the automated assistant). As another example, if the respective confidence level fails to satisfy the threshold confidence level, full performance of the action can additionally or alternatively be purposefully delayed. For instance, a communication session can be established with a music streaming service, but requesting music from "John Roe" may be delayed (e.g., for 1-3 seconds) to enable time for the user to provide a corrective utterance and to prevent potentially wasteful transmission and/or rendering of errant audio data.

In some additional and/or alternative versions of those implementations, in response to determining that the respective confidence level associated with the given speech hypothesis that is selected as corresponding to the spoken utterance satisfies the threshold confidence level, the automated assistant can deactivate one or more of the components of the computing device prior to receiving the additional audio data corresponding to the additional spoken utterance. For example, if the automated assistant determines that the spoken utterance corresponds to the given speech hypothesis of "Play some music by John Roe", and the respective confidence level associated with the given speech hypothesis satisfies the threshold confidence level, then speech recognition may be deactivated. By deactivating speech recognition in such situations, processor and/or power resources can be conserved that would otherwise be required to keep it active. To reactivate one or more of the components, the user may need to again invoke the automated assistant.

In some additional and/or alternative versions of those implementations, determining whether to keep one or more of the components of the client device active or deactivate one or more of the components can be based on other factors. The other factors can include, for example, the action determined based on the spoken utterance, environmental characteristics in an environment of the user when the spoken utterance was received, a frequency at which the user of the client device provides follow up utterances (and optionally where the follow up utterances correct misrecognitions). For example, if the action determined based on the spoken utterance includes a slot value that is a proper noun (e.g., "Give me directions to Ron's house", "Play a song by John Doe", etc.) or the action is a type of action that often includes a misrecognition, then one or more of the components of the client device may be kept active in anticipation of receiving an additional spoken utterance to correct a possible misrecognition. However, if the action determined based on the spoken utterance does not include a proper noun (e.g., "Open the navigation application", "Play some music", etc.) or the action is rarely misrecognized, then one or more of the components of the client device may be deactivated. As another example, if an ambient noise in an environment of the user exceeds a threshold noise level, then one or more of the components of the client device may be kept active in anticipation of receiving an additional spoken utterance to correct a possible misrecognition due to the ambient noise. As yet another example, if a user frequently provides a follow-up spoken utterance to correct misrecognitions (e.g., for a threshold number or percentage of spoken utterances provided by the user), then one or more of the components of the client device may be kept active in anticipation of receiving an additional spoken utterance to correct a possible misrecognition.

In some versions of those implementations, the additional audio data corresponding to the additional spoken utterance can be processed to determine whether at least a portion of the spoken utterance is similar to an additional portion of the additional spoken utterance. The similarity between the portion of the spoken utterance and the additional portion of the additional spoken utterance can be, for example, phonetic similarity. In some further versions of those implementations, acoustic features of the features of the spoken utterance can be compared to additional acoustic features of the additional spoken utterance. Comparing the acoustic features and the additional acoustic can include, for example, and with respect to the similar portions of the spoken utterance and the additional spoken utterance, comparing an audio waveform of the spoken utterance and the additional spoken utterance, comparing mel-frequency Cepstral coefficients (MFCCs) of the spoken utterance and the additional spoken utterance, comparing mel filterbank features of the spoken utterance and the additional spoken utterance and/or comparing other acoustic features, such as an embedding derived from a machine learning model that processes or recognizes the speech (e.g., a voice activity detector, word detection model(s) 150A, speech recognition model(s) 120A, and/or other machine learning models). Based on comparing the acoustic features and the additional acoustic features, the automated assistant can identify whether at least a portion of the spoken utterance and an additional portion of the additional spoken are similar.

In some additional and/or alternative versions of those implementations, the additional audio data that corresponds to the additional spoken utterance can be processed, using the speech recognition model(s), to generate a plurality of additional speech hypotheses (e.g., transcription hypotheses and/or term hypotheses). In some versions of those implementations, the plurality of additional speech hypotheses can be restricted to the plurality of speech hypotheses generated in processing the original audio data that corresponds to the spoken utterance, and can optionally omit the given speech hypothesis that was selected as corresponding to the spoken utterance. For example, assume the spoken utterance corresponds to "Play a song by John Doe", the assistant audibly rendered "Ok, playing a song by John Roe", and the additional spoken utterance correspond to "No, John Doe". In this example (and assuming the automated assistant is confident the term hypotheses for "Play", "a", "song", "by", "John" are correct), the automated assistant compares acoustic features of the spoken utterances, and determines that "Roe" and "Doe" are similar (e.g., phonetically, acoustically, and/or textually). The additional spoken utterance of "No, John Doe" can be processed, using the speech recognition model(s), to generate the additional speech hypotheses (e.g., transcription hypotheses and/or term hypotheses) that are restricted to those considered in previously processing the prior spoken utterance of "Play a song by John Doe". Further, the automated assistant can select an additional transcription hypothesis of "Play a song by John Doe" as the correct speech hypothesis for the prior spoken utterance by using the alternate term hypothesis of "Doe" instead of "Roe". In contrast, assume the spoken utterance corresponds to "Play a song by John Doe", the assistant audibly rendered "Ok, playing a song by John Roe", and the additional spoken utterance corresponds to "No, John Smith". In this example, the automated assistant can compare acoustic features of the spoken utterances, and determines that "Roe" and "Smith" are not similar, and that the correction by the user was not due to misrecognition.

In some additional and/or alternative versions of those implementations, an additional transcription corresponding to the additional given speech hypothesis can be generated. The additional transcription corresponding to the additional given speech hypothesis can be compared to the original transcription corresponding to the original given speech hypothesis to determine similarity between the original spoken utterance and the additional spoken utterance. The similarity between the transcriptions can be determined based on, for example, an edit distance between one or more recognized terms included in the transcriptions and/or other textual or phonetic similarities. Continuing with the above examples, a portion of the transcription that corresponds that to the given speech hypothesis (e.g., "Roe") can be compared to an additional portion of the additional transcription that corresponds to the additional given speech hypothesis (e.g., "Doe" or "Smith"). Based on an edit distance between "Roe" and "Doe" determined based on the comparison, the automated assistant can determine the similarity satisfies a similarity threshold. In this example, the edit distance may be relatively small, and the misrecognition (e.g., selecting "Roe" instead of "Doe") can be identified. In contrast, based on an edit distance between "Roe" and "Smith" determined based on the comparison, the automated assistant can determine the similarity does not satisfy a similarity threshold. In this example, the edit distance may be relatively larger, and that the additional spoken utterance was not provided due to misrecognition.

In various implementations, the automated assistant can supplant the original action determined based on the original spoken utterance with an alternate action. For example, the automated assistant can supplant an intent determined for the original action or a slot value determined for the original action. Continuing with the above example, the automated assistant can supplant the slot value of "John Roe" with an alternate slot value of "John Doe" based on identifying the misrecognition. In this example, the resulting alternate action includes the same intent of "Play a song", but a different slot value of "John Doe" for the "artist" parameter. The automated assistant can then initiate performance of the action corresponding to "Play a song by John Doe" as the user originally intended. In some versions of those implementations, the automated assistant can audibly render an additional spoken response that includes an indication of the alternate action (e.g., "Right, John Doe"). Further, the automated assistant can halt the errant original action, if it was initiated and is still ongoing (e.g., stop playing a song), or reverse the errant original action (e.g., turn off a light that was not supposed to be turned on).

In various implementations, the automated assistant can cause speech recognition to be biased towards the alternate action and/or away from the action. For example, if the user were to subsequently provide a further additional spoken utterance of "Play another song by John Doe" (either in the same dialog session or a subsequent dialog session), the automated assistant can cause the processing, using the speech recognition model(s), of the further additional spoken utterance to be biased towards "John Doe" and/or away from "John Roe" as the slot value for the "artist" parameter of a subsequent action. In contrast, with respect to the "John Roe" and "John Smith" example from above, the automated assistant may not cause the processing, using the speech recognition model(s), of the further additional spoken utterance to be biased towards "John Smith" and/or away from "John Roe" as the slot value for the "artist" parameter of a subsequent action since the previous correction was not due to misrecognition. In some versions of those implementations, the automated assistant may only cause the processing of the spoken utterance to be biased during the current dialog session. In some additional and/or alternative versions of those implementations, the automated assistant may cause the processing of the spoken utterance to be biased during subsequent dialog sessions.

In various implementations, and with respect to the automated assistant causing the computing device to render an indication of the action to be performed, the indication rendered may be based on the confidence level associated with the given speech hypothesis (e.g., the transcription hypothesis as a whole and/or the term hypotheses for terms included in the transcription) that is selected as corresponding to the spoken utterance. For example, if the confidence level satisfies a first threshold confidence level, this may indicate the automated assistant is highly confident that the given speech hypothesis corresponds to the spoken utterance, and the automated assistant may fully perform the action without audibly rendering the spoken response that indicates the action to be performed, and may deactivate one or more of the components of the computing device. For instance, if the spoken utterance is "Play a song by John Doe" and the automated assistant is highly confident a transcription of "Play a song by John Doe" and/or the terms thereof correspond to the spoken utterance, then the automated assistant may play the song. As another example, if the confidence level fails to satisfy the first threshold confidence level, but satisfies a second threshold confidence level, this may indicate the automated assistant is mildly confident that the given speech hypothesis corresponds to the spoken utterance, and the automated assistant may audibly render the spoken response that indicates the action to be performed and may initiate performance of the action, but may keep one or more of the components of the computing device active. For instance, if the spoken utterance is "Play a song by John Doe" but the automated assistant is only mildly confident a transcription of "Play a song by John Doe" and/or the terms thereof correspond to the spoken utterance, then the automated assistant may audibly render "Ok, playing a song by John Doe", and then play the song. As yet another example, if the confidence level fails to satisfy the first threshold confidence level and the second threshold confidence level, this may indicate the automated assistant is not confident that the given speech hypothesis corresponds to the spoken utterance, and the automated assistant may audibly render the spoken response that indicates the action to be performed and may determine a temporal delay prior to initiating performance of the action and may keep one or more of the components of the computing device active. For instance, if the spoken utterance is "Play a song by John Doe" but the automated assistant is not confident a transcription of "Play a song by John Doe" and/or the terms thereof correspond to the spoken utterance, then the automated assistant may audibly render "Ok, playing a song by John Doe" and establish a communication session with a music streaming service, but for the temporal delay to lapse prior to requesting a song by "John Doe". This enables time for the user to provide a corrective utterance and to prevent potentially wasteful transmission and/or rendering of errant audio data.

The above description is provided as an overview of only some implementations disclosed herein. Those implementations, and other implementations, are described in additional detail herein.

It should be understood that techniques disclosed herein can be implemented locally on a client device, remotely by server(s) connected to the client device via one or more networks, and/or both.

Various implementations can include a non-transitory computer readable storage medium storing instructions executable by a processor to perform a method such as one or more of the methods described herein. Yet other various implementations can include a system including memory and one or more hardware processors operable to execute instructions, stored in the memory, to perform a method such as one or more of the methods described herein.

DETAILED DESCRIPTION

Figure 1:
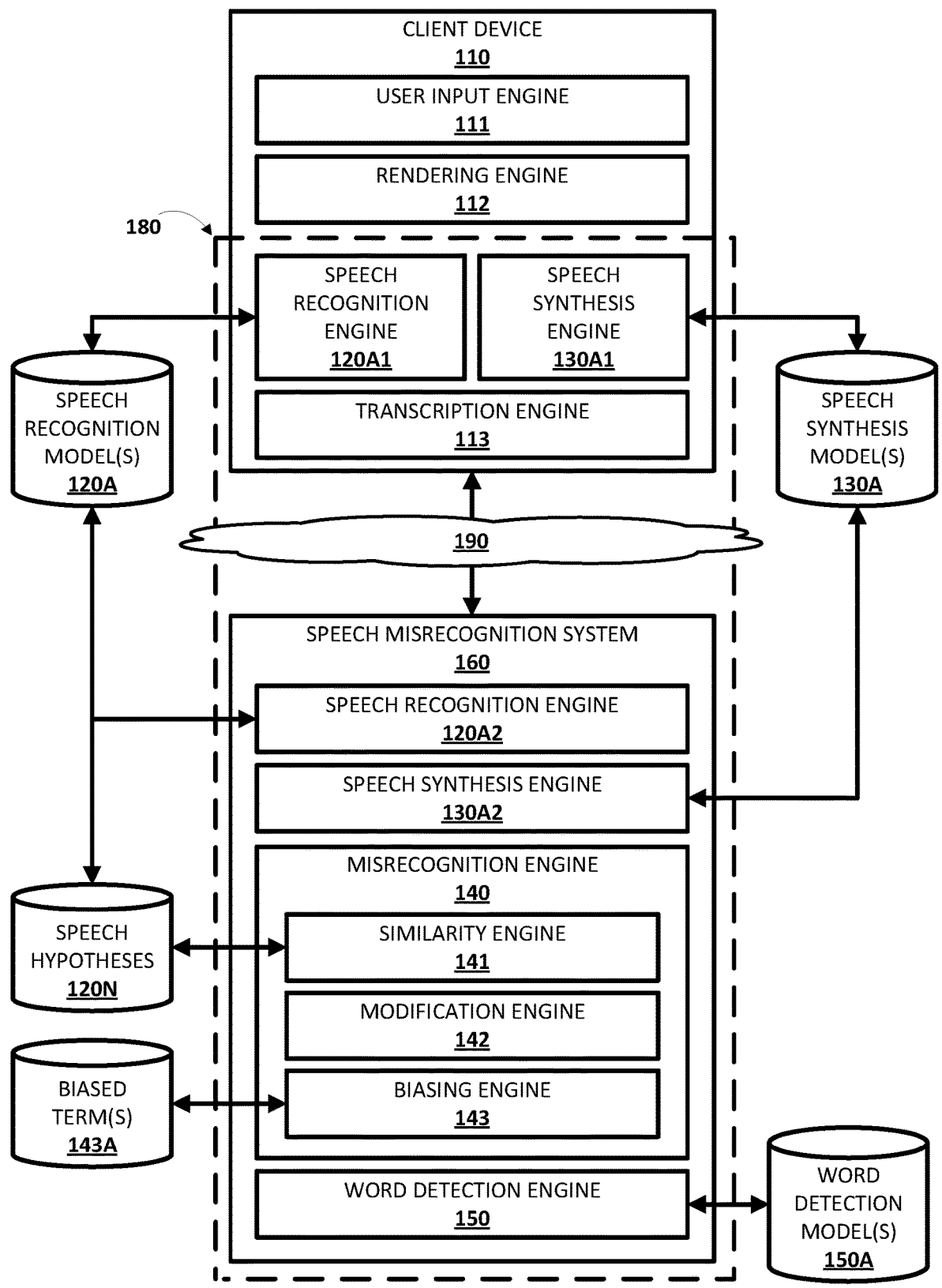
FIG. 1 depicts a block diagram of an example environment that demonstrates various aspects of the present disclosure, and in which implementations disclosed herein may be implemented.

Turning now to FIG. 1, a block diagram of an example environment that demonstrates various aspects of the present disclosure is depicted. A client device 110 is illustrated in FIG. 1, and includes, in various implementations, a user input engine 111, a rendering engine 112, a speech recognition engine 120A1, a speech synthesis engine 130A1, and a transcription engine 113. The client device 110 can be, for example, a mobile device, a standalone device having a display, a standalone speaker device, a laptop, a computer, a home automation device, and/or any other device(s) capable of implementing a human-to-computer dialog session. A speech misrecognition system 160 is also illustrated in FIG. 1, and includes, in various implementations, speech recognition engine 120A2, speech synthesis engine 130A2, misrecognition engine 140, and word detection engine 150. In some implementations, the speech misrecognition system 160 can be implemented by server(s) in communication with the client device 110 over network(s) 190 as shown in FIG. 1. The network(s) 190 can include, for example, Wi-Fi®, Bluetooth®, near-field communication, local area network(s), wide area network(s), and/or other networks. In other implementations, the speech misrecognition system 160 can be implemented locally at the client device 110. An automated assistant 180 can be implemented locally at the client device 110, remotely at the speech misrecognition system 160, or at both in a distributed manner (e.g., as shown by the dashed line in FIG. 1). The automated assistant 180 can facilitate operations performed by the client device 110 and/or the speech misrecognition system 160.

Figure 2A:
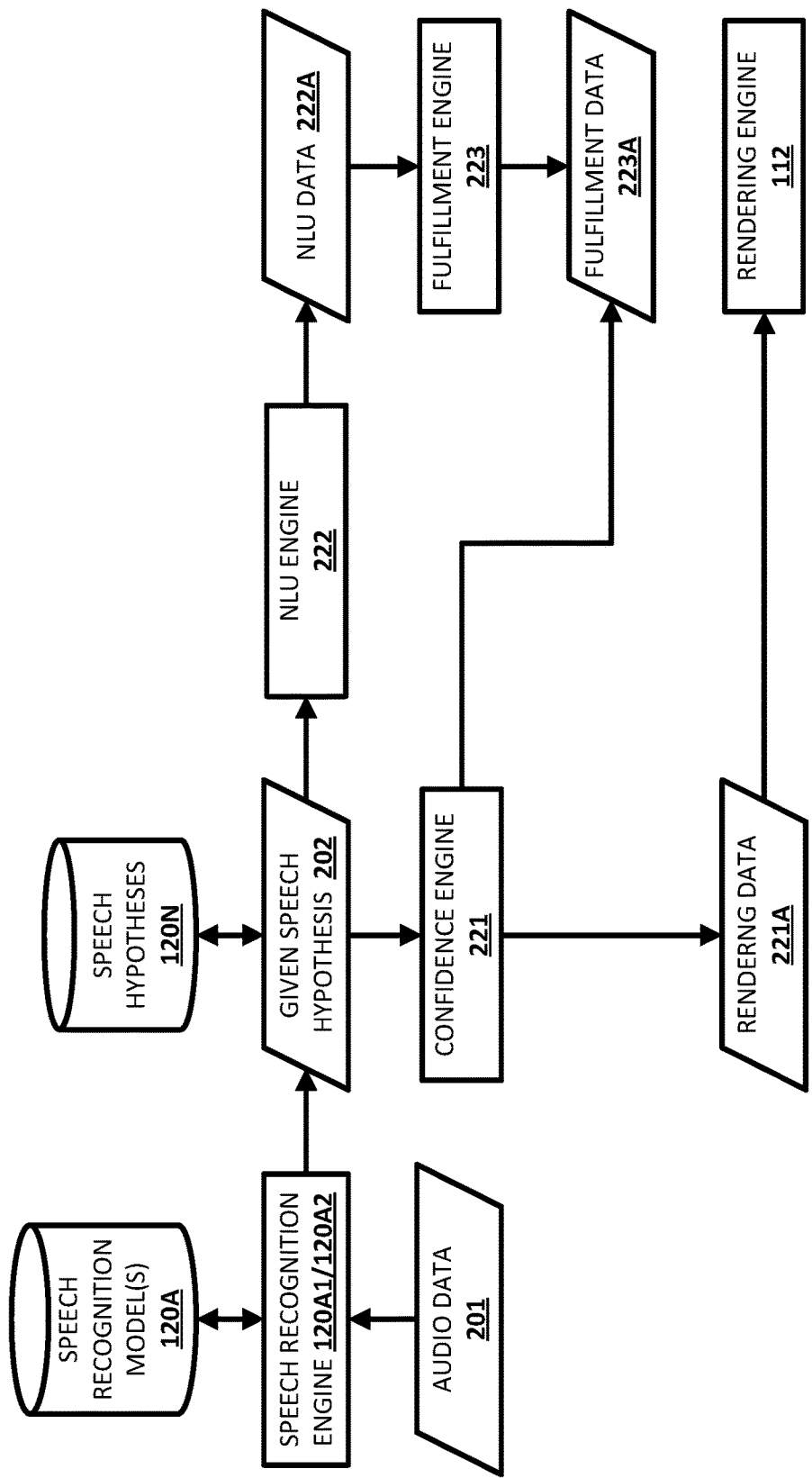
FIGS. 2A and 2B depict process flows illustrating example implementations of utilizing the various components of FIG. 1 in identifying speech misrecognitions, in accordance with various implementations.

For example, and referring to FIG. 2A, assume audio data 201 corresponding to a spoken utterance of "send a text message to Ron" is received at the client device 110. The automated assistant 180 can cause the speech recognition engine 120A1 and/or 120A2 to process, using the speech recognition model(s) 120A, the audio data 201, and the automated assistant 180 can select a given speech hypothesis 202, of a plurality of speech hypotheses, based on a respective confidence level associated with each of the plurality of speech hypotheses. The automated assistant 180 can also cause the plurality of speech hypotheses to be stored in memory and/or one or more databases (e.g., in the speech hypotheses database 120N). Further assume the given speech hypothesis 202 selected by the automated assistant 180 as corresponding to the spoken utterance captured in the audio data 201 corresponds to a given transcription hypothesis of "send a text message to Don" that misrecognized "Ron" as "Don".

In some implementations, the automated assistant 180 may only use the speech recognition engine 120A1 that is local to the client device 110 in processing the spoken utterance to generate the plurality of speech hypotheses. In other implementations, the automated assistant 180 may only use the speech recognition engine 120A2 that is remote to the client device 110 in processing the spoken utterance to generate the plurality of speech hypotheses. In some additional and/or alternative implementations, the automated assistant 180 may cause both the speech recognition engine 120A1 and the speech recognition engine 120A2 to generate the plurality of speech hypotheses, such that the plurality of speech hypotheses include speech hypotheses generated by both of the speech recognition engines 120A1 and/or 120A2. The plurality of speech hypotheses can be stored in memory (e.g., short-term memory) and/or one or more databases accessible at the client device 110 and/or the speech misrecognition system 160 (e.g., in speech hypotheses database 120N).

In some implementations, the speech recognition model(s) 120A are end-to-end speech recognition model(s), such that the speech recognition engine(s) 120A1 and/or 120A2 can generate the plurality of speech hypotheses corresponding to the spoken utterance directly using the speech recognition model(s) 120A. For instance, the speech recognition model(s) 120A can be used to generate the textual(s) plurality of speech hypotheses on a character-by-character basis (or a token-by-token basis). One non-limiting example of such end-to-end model(s) used to generate the plurality of speech hypotheses on a character-by-character basis is a recurrent neural network transducer (RNN-T) model. An RNN-T model is a form of sequence-to-sequence model that does not employ attention mechanisms. Unlike most sequence-to-sequence models, which typically need to process the entire input sequence (e.g., an audio data waveform, mel-frequency Cepstral coefficients (MFCCs), and/or other representation) to generate predicted output, an RNN-T model can be used to continuously process input samples and stream output symbols (e.g., characters of the alphabet). Also, for example, when the speech recognition model(s) 120A are not end-to-end speech recognition model(s) 120A, the speech recognition engine(s) 120A1 and/or 120A2 can instead generate predicted phoneme(s) (and/or other representations). For instance, with such models the predicted phoneme(s) (and/or other representations) are then utilized by the speech recognition engine(s) 120A1 and/or 120A2 to determine the plurality of speech hypotheses that conform to the predicted phoneme(s). In doing so, the speech recognition engine(s) 120A1 and/or 120A2 can optionally employ a decoding graph, a lexicon, and/or other resource(s).

The plurality of speech hypotheses can include, for example, a plurality of term hypotheses and a plurality of transcription hypotheses. For example, assume the client device 110 receives a spoken utterance of "send a text message to Ron" that is detected via the user input engine 111, and microphone(s) of the client device 110 generate audio data that corresponds to the spoken utterance. The automated assistant 180 can cause the speech recognition engine(s) 120A1 and/or 120A2 to process, using the speech recognition model(s) 120A, the audio data that corresponds to the spoken utterance to generate the plurality of speech hypotheses. In this example, the speech recognition engine(s) 120A1 and/or 120A2 can generate term hypotheses corresponding to each term included in the spoken utterance. For example, term hypotheses corresponding to "Ron" of the spoken utterance can include term hypotheses of "Ron" (e.g., associated with a first confidence level), "Don" (e.g., associated with a second confidence level), "Juan" (e.g., associated with a third confidence level), and so on. Further assume the automated assistant 180 is highly confident in term hypotheses for "send", "a", "text", "message", and "to" of the spoken utterance, but is not highly confident in a given term hypothesis corresponding to "Ron". The plurality of transcription hypotheses can be generated based on the plurality of term hypotheses corresponding to "Ron" of the spoken utterance, resulting in transcription hypotheses of "send a text message to Ron", "send a text message to Don", "send a text message to Juan", and so on. Each of the transcription hypotheses can be associated with a respective confidence level that corresponds to the respective confidence level for the term hypothesis corresponding to "Ron" that is included in each of the transcription hypotheses. The automated assistant 180 can select a given term hypothesis, of the plurality of term hypotheses, corresponding to "Ron" for the spoken utterance based on the respective confidence levels, thereby also selecting a given transcription hypothesis, of the plurality of transcription hypotheses, that includes the given term hypothesis.

The automated assistant 180 can determine an action to be performed based on a given speech hypothesis (e.g., the given term hypothesis and/or the given transcription hypothesis). The action can include, for example, an intent and slot value(s) for parameter(s) associated with the intent. As described below (e.g., with respect to FIGS. 2A and 2B), the automated assistant can process, using a natural language understanding ("NLU") engine, the given transcription hypothesis to determine the intent. Continuing with the above example, assume the automated assistant 180 selected "send a text message to Don" as the given transcription hypothesis corresponding to the spoken utterance (instead of "Ron" as intended by the user). In this example, the intent of the action may be "send a text message", and the slot value for a "recipient" parameter may be "Don" (and optionally a slot value for a "text message content" parameter if included in the spoken utterance). The automated assistant 180 can cause the rendering engine 112 of the client device 110 to audibly render a spoken response that is based on the given transcription hypothesis. Continuing with the above example, the automated assistant 180 can cause the client device 110 to audibly render, via speaker(s) of the client device 110, a spoken response of "Ok, sending a text message to Don" that indicates the action to be performed by the automated assistant 180. In some implementations, speech synthesis engine 130A1 of the client device and/or speech synthesis engine 130A2 can process, using speech synthesis model(s) 130A, the given speech hypotheses to generate the spoken response that is audibly rendered via the speaker(s) of the client device 110.

In some implementations, the automated assistant 180 can cause the transcription engine 113 of the client device 110 to generate a transcription based on the given speech hypothesis that is selected as corresponding to the spoken utterance. Continuing with the above example, the automated assistant can generate a transcription of "Ok, sending a text message to Don". In some additional and/or alternative implementations where the client device 110 includes a display, the automated assistant 180 can cause rendering engine 112 of the client device 110 to visually render, via the display, the transcription of "Ok, sending a text message to Don", a text message conversation between a user of the client device 110 and "Don", one or more control elements for editing and/or sending the text message to "Don", and so on. In implementations where the automated assistant 180 causes the transcription engine 113 of the client device 110 to generate the transcription, the speech synthesis engine 130A1 and/or 130A2 can process, using the speech synthesis model(s) 130A, the transcription to generate the spoken response that is audibly rendered via the speaker(s) of the client device 110.

For example, and referring to FIG. 2A, assume audio data 201 corresponding to a spoken utterance of "send a text message to Ron" is received at the client device 110. The automated assistant 180 can cause the speech recognition engine 120A1 and/or 120A2 to process, using the speech recognition model(s) 120A, the audio data 202, and the automated assistant 180 can select a given speech hypothesis 202, of a plurality of speech hypotheses, based on a respective confidence level associated with each of the plurality of speech hypotheses. The automated assistant 180 can also cause the plurality of speech hypotheses to be stored in memory and/or one or more databases (e.g., in the speech hypotheses database 120N). Further assume the given speech hypothesis 202 selected by the automated assistant 180 as corresponding to the spoken utterance captured in the audio data 201 corresponds to a given transcription hypothesis of "send a text message to Don" that misrecognized "Ron" as "Don".

The automated assistant 180 can cause NLU engine 222 to process the given speech hypothesis 202 (and/or a transcription thereof) to generate NLU data 222A. Further, the automated assistant 180 can determine an action to be performed responsive to receiving the audio data 201. For instance, the NLU data 222A may include an intent of "send a text message", and a slot value of "Don" for a "recipient" parameter associated with the intent. The NLU data 222A can optionally include slot value(s) for other parameter(s) associated with the intent. Moreover, the automated assistant can cause the fulfillment engine 223 to process the NLU data 222A to generate fulfillment data 223A. For instance, the fulfillment data 223A may include a request to establish communication with a third-party service (e.g., a music streaming service, a restaurant reservation service, and/or other third-party services), a request that is to be transmitted to a software application accessible by the computing device 110 or a home automation device that represents the action, and/or other fulfillment data 223A.

In various implementations, the automated assistant 180 can cause confidence engine 221 to process the given speech hypothesis 202. The confidence engine 221 can determine whether the respective confidence level associated with the given speech hypothesis 202 satisfies one or more threshold confidence levels. In some versions of those implementations, the automated assistant 180 can cause the client device 110 and/or the speech misrecognition system 160 to keep one or more components active, or deactivate one or more of the components, based on the respective confidence level associated with the given speech hypothesis 202. For instance, if the respective confidence level associated with the given speech hypothesis 202 satisfies a threshold confidence level, then the automated assistant 180 may cause the client device 110 and/or the speech misrecognition system 160 to deactivate one or more of the components of the client device 110 and/or the speech misrecognition system 160 (e.g., speech recognition engine 120A1 and/or 120A2). However, if the respective confidence level associated with the given speech hypothesis 202 fails to satisfy the threshold confidence level, then the automated assistant 180 may cause the client device 110 and/or the speech misrecognition system 160 to keep one or more of the components of the client device 110 and/or the speech misrecognition system 160 active (e.g., speech recognition engine 120A1 and/or 120A2). Moreover, in keeping one or more of the components active, certain parameters of the one or more components may be adapted. For instance, speech recognition may be limited to a voice that corresponds to a user that provided the original spoken utterance (e.g., using voice ID) and/or endpointing of the additional audio data 203 may be restricted to an expected length of any additional spoken utterance that corrects a misrecognition, such as a length of a shortest speech hypothesis, of the plurality of speech hypotheses, to a length of a longest speech hypothesis, of the plurality of speech hypotheses. Moreover, the one or more components may be kept active for a pre-defined period of time (e.g., three seconds, four seconds, and so on), until the automated assistant 180 initiates performance of the action, or for a pre-defined period of time after the automated assistant 180 initiates performance of the action (e.g., two seconds, five seconds, and so on) and/or fully performs the action. In other words, the automated assistant 180 can keep component(s) of the client device 110 and/or the speech misrecognition system 160 active if the automated assistant 180 is not confident in the interpretation of the audio data 201.

In some additional and/or alternative versions of those implementations, determining whether to keep one or more of the components of the client device 110 active or deactivate one or more of the components can be based on other factors that are in addition to, or in lieu of, the respective confidence level associated with the given speech hypothesis 202. The other factors can include, for example, the action determined based on the audio data 201, environmental characteristics in an environment of the user of the client device 110 when the audio data 201 was received, a frequency at which the user of the client device 110 provides follow up utterances (and optionally where the follow up utterances correct misrecognitions). For example, if the action determined based on the audio data 201 includes a slot value that is a proper noun (e.g., "Give me directions to Ron's house", "Play a song by John Doe", etc.) or the action is a type of action that often includes a misrecognition, then one or more of the components of the client device 110 may be kept active in anticipation of receiving additional audio data to correct a possible misrecognition. However, if the action determined based on the spoken utterance does not include a proper noun (e.g., "Open the navigation application", "Play some music", etc.) or the action is rarely misrecognized, then one or more of the components of the client device 110 may be deactivated. As another example, if an ambient noise in an environment of the user of the client device 110 exceeds a threshold noise level, then one or more of the components of the client device 110 may be kept active in anticipation of receiving additional audio data to correct a possible misrecognition due to the ambient noise. As yet another example, if a user frequently provides a follow-up spoken utterance to correct misrecognitions (e.g., for a threshold number or percentage of spoken utterances provided by the user), then one or more of the components of the client device 110 may be kept active in anticipation of receiving additional audio data to correct a possible misrecognition.

In some additional and/or alternative versions of those implementations, the automated assistant 180 can cause the confidence engine 221 to generate rendering data 221A based on whether the respective confidence level associated with the given speech hypothesis 202 satisfies one or more threshold confidence levels. For example, if the respective confidence level associated with the given speech hypothesis 202 satisfies a first threshold confidence level, then the rendering data 221A may indicate the spoken response that indicates the action to be performed by the automated assistant 180 should not be rendered via the rendering engine 112. In this example, the confidence engine 221 can cause the fulfillment data 223A to be executed in response to determining that the given speech hypothesis 202 satisfies the first threshold confidence level. As another example, if the respective confidence level associated with the given speech hypothesis 202 fails to satisfy the first threshold confidence level but satisfies a second threshold confidence level, then the rendering data 221A may indicate that the spoken response that indicates the action to be performed by the automated assistant 180 should be rendered via the rendering engine 112. In this example, the confidence engine 221 can cause the fulfillment data 223A to be executed in response to determining that the given speech hypothesis 202 fails to satisfy the first threshold confidence level but satisfies the second confidence level. This enables the user of the client device 110 to correct any misrecognitions in response to perceiving the spoken response. As yet another example, if the respective confidence level associated with the given speech hypothesis 202 fails to satisfy the first threshold confidence level and fails to satisfy the second threshold confidence level, then the rendering data 221A may indicate that the spoken response that indicates the action to be performed by the automated assistant 180 should be rendered via the rendering engine 112. In this example, the confidence engine 221 can cause a portion of the fulfillment data 223A to be executed in response to determining that the given speech hypothesis fails to satisfy both the first and second threshold confidence levels (e.g., establishing a connection with the third-party service), and cause another portion of the fulfillment data 223A to be executed in response to determining that a temporal delay has lapsed. This enables the user of the client device 110 to correct any misrecognitions in response to perceiving the spoken response, and ensures computational and/or network resources are not wasted.

Referring back to FIG. 1, the misrecognition engine 140 can include, in various implementations, similarity engine 141, modification engine 142, and biasing engine 143 as depicted in FIG. 1. For example, with respect to the misrecognition engine 140, assume that the client device 110 received a spoken utterance of "send a text message to Ron", and assume that the automated assistant 180 selected "send a text message to Don" as the given speech hypothesis corresponding to the spoken utterance (instead of "Ron" as intended by the user) and that the automated assistant 180 caused the client device 110 to render the spoken response of "Ok, sending a text message to Don". Further assume that the client device 110 receives an additional spoken utterance of "No, Don" in response to the audible rendering of the spoken response at the client device 110 or an additional client device of the user.

The similarly engine 141 can compare acoustic features of the spoken utterance to additional acoustic features of the additional spoken utterance to identify a portion of the spoken utterance that is similar to an additional portion of the additional spoken utterance. The acoustic features can include, for example, MFCCs, audio waveforms, and/or other acoustic features of audio data that can be compared. Continuing with the above example, the similarity engine 141 can compare acoustic features of the spoken utterance of "send a text message to Ron" to additional acoustic features of the additional spoken utterance of "No, Ron", and can identify that the portion of the spoken utterance corresponding to "Ron" is acoustically similar to the portion of the additional spoken utterance corresponding to "Ron".

Further, the automated assistant 180 can cause the speech recognition engine 120A1 and/or 120A2 to process, using the speech recognition model(s) 120A, at least the similar additional portion of the additional spoken utterance to generate a plurality of additional speech hypotheses. In determining whether the similar additional portion of the additional spoken utterance is intended to correct a misrecognition, the plurality of additional speech hypotheses may be restricted to those that overlap with the plurality of speech hypotheses generated in processing the original spoken utterance (e.g., stored in memory and/or the speech hypotheses database 120N). For instance, assume the original term hypotheses generated in interpreting "Ron" for the original spoken utterance included at least "Don", "Ron", "Juan", and that "Don" was the selected term hypothesis. In determining whether the similar additional portion of "Ron" is intended to correct the misrecognition, the similarity engine may limit term hypotheses considered to "Don", "Ron", and "Juan", and optionally omit "Don" since it was previously selected as the term hypothesis corresponding to "Ron". As a result, the automated assistant 180 can select an additional given speech hypothesis, of the plurality of additional speech hypotheses, to correct the misrecognition. In some implementations, the automated assistant 180 can cause the transcription engine 113 to generate an additional transcription based on the additional given speech hypothesis based on the original transcription and/or the additional given speech hypothesis.

The modification engine 142 can determine an alternate action to be performed by the automated assistant 180 based on the additional given speech hypothesis, and can supplant the original action with the alternate action. The alternate action can include an alternate intent and/or alternate slot value(s) for the original parameter(s) associated with the original intent. Continuing with the above example, the "send a text message" intent may remain the same, but the slot value of "Don" for the "recipient" parameter may be supplanted with an alternate slot value of "Ron". The automated assistant 180 may then initiate performance of the alternate action.

Figure 2B:
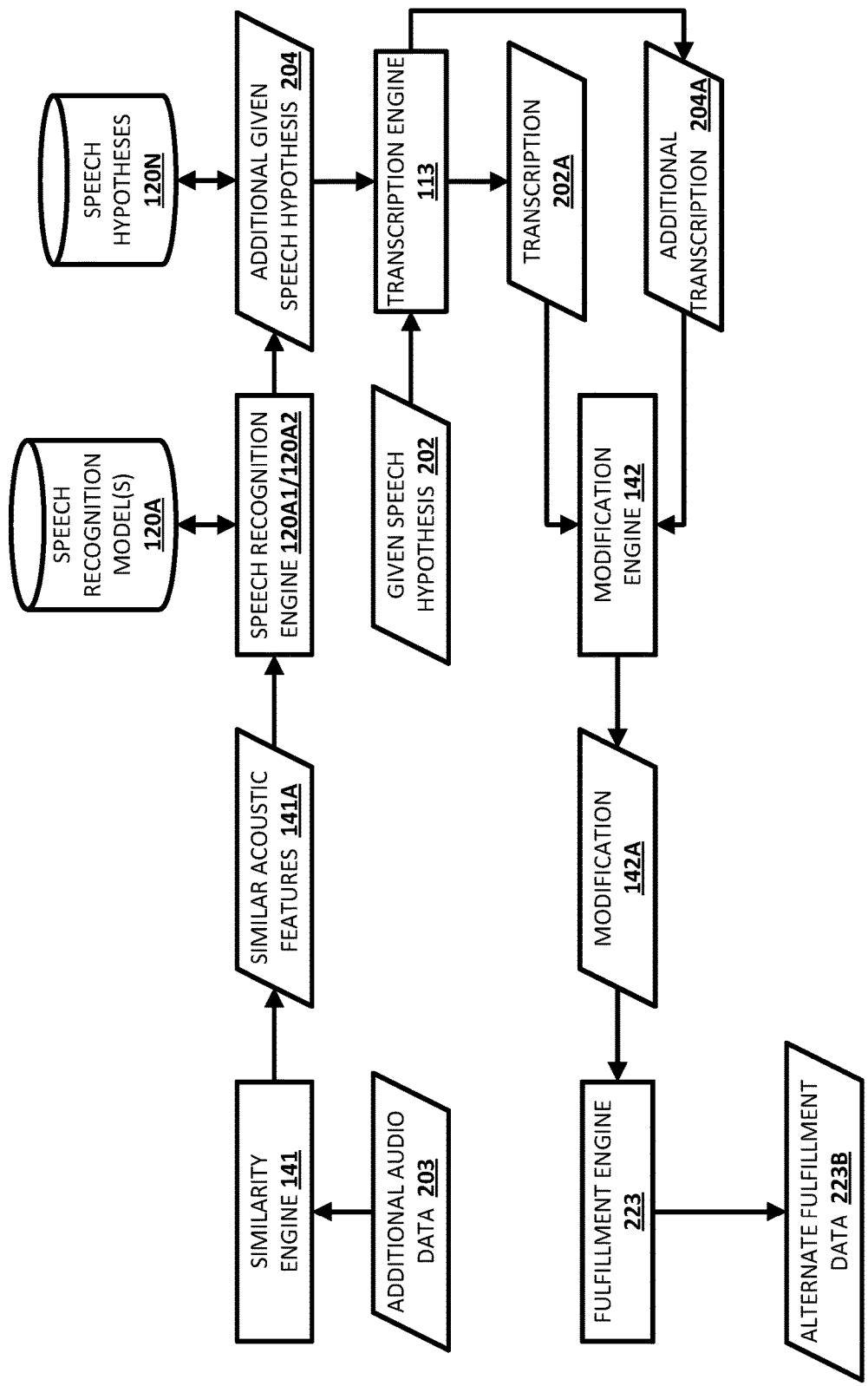

For example, and referring to FIG. 2B, assume the audio data 201 corresponding to a spoken utterance of "send a text message to Ron" is received at the client device 110, assume that the automated assistant 180 selected "send a text message to Don" as the given speech hypothesis corresponding to the spoken utterance (instead of "Ron" as intended by the user), assume that the automated assistant 180 caused the client device 110 to render the spoken response of "Ok, sending a text message to Don", and assume additional audio data 203 corresponding to an additional spoken utterance of "No, Ron" is received at the client device 110. In some implementations, the additional audio data 203 can optionally be filtered to remove any audio data corresponding to the spoken response if the additional audio data 203 is received while the spoken response is being audibly rendered via the speaker(s) of the client device 110 and/or to remove any other audio data of other humans in the environment (e.g., via voice filtering) or ambient noise.

The similarity engine 141 can identify similar acoustic features 141A in the audio data 201 and the additional audio data 203. The similar acoustic features 141A can include, for example, acoustic features from the audio data 201 corresponding to "Ron" and additional acoustic features from the additional audio data 203 corresponding to "Ron". The automated assistant 180 can cause the speech recognition engine 120A1 and/or 120A2 to process, using the speech recognition model(s) 120A, the additional audio data 203 corresponding to the additional acoustic features from the additional audio data 203 corresponding to "Ron" to generate a plurality of additional speech hypotheses. The plurality of additional speech hypotheses can optionally be restricted to those that overlap with the original plurality of speech hypotheses that were generated in processing the audio data 201 (e.g., stored in memory and/or the speech hypotheses database 120N).

Further, the automated assistant 180 can select an additional given speech hypothesis 204, of the plurality of additional speech hypotheses, as corresponding to the additional audio data 203. Notably, the additional given speech hypothesis 204 is distinct from the given speech hypothesis 202. For instance, since the given speech hypothesis 202 corresponded to the misrecognition that includes "Don", the additional given speech hypothesis 204 may correspond to "Ron" as the user intended. Although the implementations are described herein with respect to identifying the misrecognition based on a first additional spoken utterance, it should be understood that the techniques described herein can be repeated on subsequent additional utterances until the misrecognition is corrected.

Moreover, assuming that the automated assistant 180 selects the additional given speech hypothesis 204 corresponding to "Ron", the automated assistant 180 can cause the transcription engine 113 to generate a transcription 202A that corresponds to the given speech hypothesis and an additional transcription 204A that corresponds to the additional given speech hypothesis. Further, the automated assistant 180 can cause the modification engine 142 to determine the alternate action to be performed by the automated assistant to generate a modification 142A. In this example, the alternate action can include the same intent (e.g., "send a text message"), but an alternate slot value of "Ron" to supplant the slot value of "Don". The modification 142A can include, for example, alternate NLU data that modifies the NLU data 222A based on the alternate action. The automated assistant 180 can cause the fulfillment engine 223 to generate alternate fulfillment data 223B based on the modification 142A. In this manner, misrecognitions can be identified and corrected in a manner that reduces a length of the human-to-computer dialog between the user and the automated assistant 180, thereby conserving computational and/or network resources.

Referring back to FIG. 1, and in various implementations, the biasing engine 143 can cause the automated assistant 180 to bias subsequent speech recognition of subsequent spoken utterances. The biasing engine 143 can identify term(s) that were misrecognized and/or term(s) that supplant the misrecognized term(s), and can store these term(s) in the biased term(s) database 143A. Continuing with the above example, the biasing engine 143 can cause the term(s) "Ron" and "Don" to be stored in the biased term(s) database. Further assume that the client device 110 receives a subsequent spoken utterance of "call Ron". In this example, the biasing engine 143 can cause the automated assistant to bias speech recognition of the subsequent spoken utterance towards the term hypothesis of "Ron" and/or away from the term hypothesis of "Don". In some implementations, the biasing engine 143 can cause the biasing engine 143 to bias the subsequent spoken utterance towards and/or away from the biased term(s) for only the current human-to-computer dialog session. In some additional and/or alternative implementations, the biasing engine 143 can cause the biasing engine 143 to bias the subsequent spoken utterance to and/or away from the biased term(s) for subsequent human-to-computer dialog sessions. For instance, the biasing may be limited to a particular user interaction and/or a particular duration of time. By limiting the biasing, the speech misrecognition system 160 can combat over biasing towards and/or away from the biased term(s).

In various implementations, the word detection engine 150 can process, using word detection model(s) 150A, audio data to determine whether the spoken utterance and/or the additional spoken utterance includes a particular term or phrase. The particular term or phrase can include, for example, a hotword or phrase that invokes the automated assistant 180 and activates one or more component(s) of the client device 110 and/or the speech misrecognition system 160 (e.g., speech recognition engine 120A1 and/or 120A2), a correction term or phrase that is indicative of a misrecognition, and/or one of the speech hypotheses considered in interpreting the original spoken utterance. For example, a first word detection model, of the word detection model(s) 150A, may be a hotword or phrase detection model that is trained to detect words and/or phrases that invoke the automated assistant 180 (e.g., "Assistant", "Hey Assistant", "Okay Assistant", and so on). Further, a second word detection model, of the word detection model(s) 140A, may a correction term or phrase model that is trained to detect words and/or phrases that are indicative of an occurrence of a misrecognition (e.g., "no", "wait", "I said", and/or any other term or phrase that is indicative of the misrecognition). In some versions of those implementations, the speech misrecognition system 160 may be implemented responsive to determining a given spoken utterance includes the correction term or phrase. As another example, a word detection model trained to identify specific term(s) or phrase(s) included in the plurality of speech hypotheses may be included (e.g., acoustically similar speech hypotheses).

Figure 3:
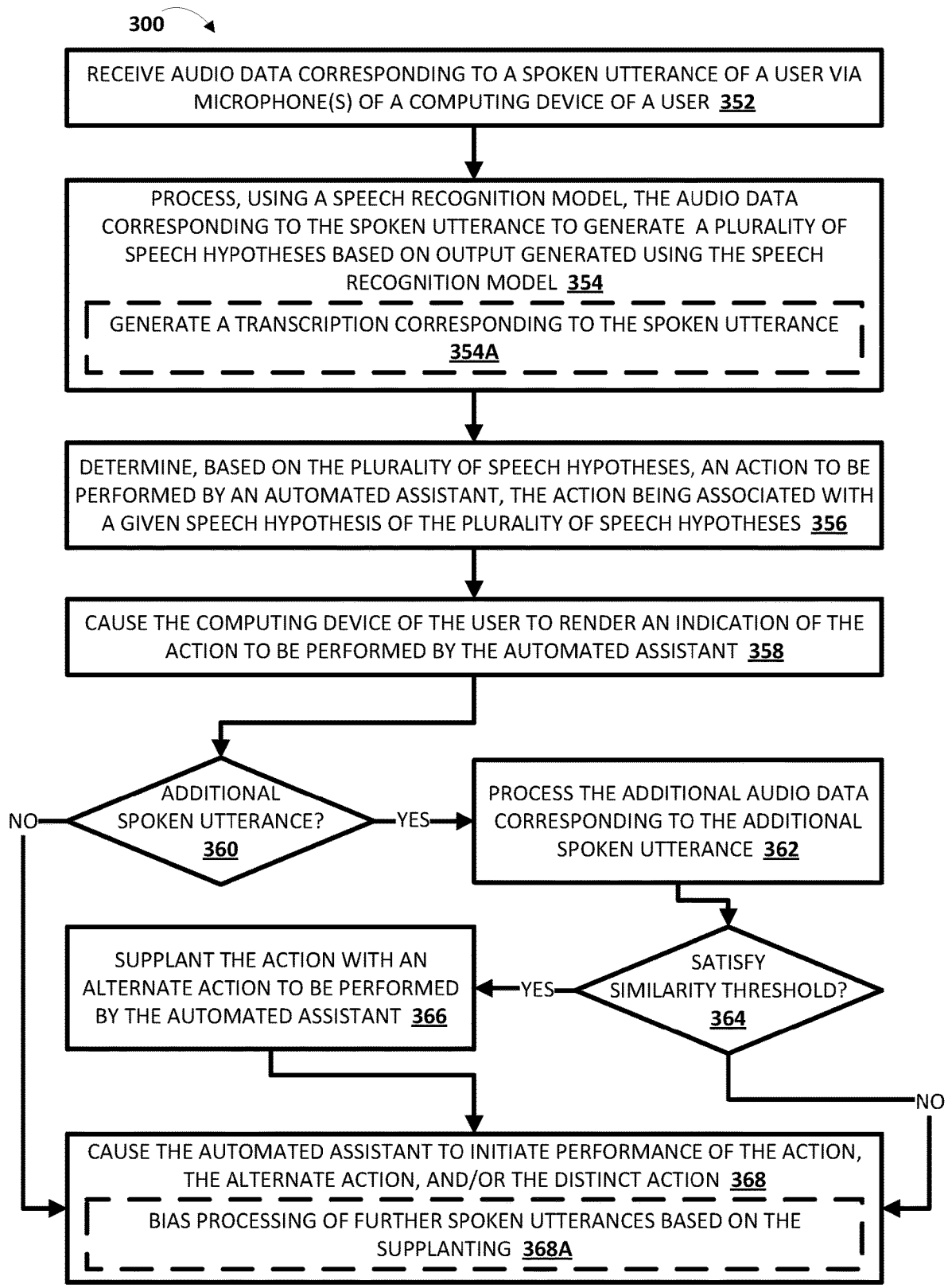
FIG. 3 is a flowchart illustrating an example method of supplanting an action to be performed by an automated assistant with an alternate action based on identifying a speech misrecognition, in accordance with various implementations.

Turning now to FIG. 3, a flowchart illustrating example method 300 of supplanting an action to be performed by an automated assistant with an alternate action based on identifying a speech misrecognition is depicted. For convenience, the operations of the method 300 are described with reference to a system that performs the operations. The system of the method 300 includes one or more processors and/or other component(s) of a computing device. For example, the system of the method 300 can be client device 110 of FIG. 1, client device 610 of FIGS. 6A-6C, computing device 710 of FIG. 7, one or more servers, other computing devices, and/or any combination thereof. Moreover, while operations of the method 300 are shown in a particular order, this is not meant to be limiting. One or more operations may be reordered, omitted, and/or added.

At block 352, the system receives audio data corresponding to a spoken utterance of a user via microphone(s) of a computing device of a user (e.g., "Play a song by John Doe", "Turn on the bedroom lights", etc.). At block 354, the system processes, using a speech recognition model, the audio data corresponding to the spoken utterance to generate a plurality of speech hypotheses based on output generated using the speech recognition model. The plurality of speech hypotheses can include, for example, term hypotheses for each term included in the spoken utterance (e.g., "Doe", "Roe", "Row", "Dough", etc.) and/or transcription hypotheses that include various combinations of the term hypotheses (e.g., "Play a song by John Doe", "Play a song by John Roe", and so on). Each of the plurality of speech hypotheses may be associated with a respective confidence level. For example, each term hypothesis may be associated with a respective confidence level. In some implementations, block 354 may include optional sub-block 354A. If included, at sub-block 354A, the system can generate a transcription corresponding to the spoken utterance. For example, the system can generate a transcription associated with a given transcription hypothesis, of the plurality of transcription hypotheses, that has the highest respective confidence level.

At block 356, the system determines, based on the plurality of speech hypotheses, an action to be performed by an automated assistant, the action being associated with a given speech hypothesis of the plurality of speech hypotheses. The action can include, for example, an intent included in the spoken utterance, and one or more slot values for one or more parameters associated with the intent. For example, assume a spoken utterance of "Play a song by John Doe" is received at the computing device of the user, but a transcription hypothesis of "Play a song by John Roe" (including term hypothesis "Roe" instead of "Doe" as intended by the user) is associated with a highest confidence level. In this example, the action may include the intent of "Play a song" (e.g., represented by term hypotheses "Play", "a", "song") and a slot value of "John Doe" for an "artist" parameter (e.g., represented by term hypotheses "John", "Doe").

At block 358, the system causes the computing device of the user to render an indication of the action to be performed by the automated assistant. In some implementations, the indication of the action to be performed can be audibly rendered at the computing device of the user or an additional computing device of the user. The audible indication of the action to be performed can include, for example, an audible ding or chirp that indicates the automated assistant received the spoken utterance, a spoken response that indicates the action to be performed by the automated assistant (e.g., "Ok, playing a song by John Roe"), and/or other audible indications. In some additional and/or alternative implementations, the indication of the action to be performed can be visually rendered at the client device of the user or the additional client device of the user. The visual indication of the action to be performed can include, for example, displaying a transcription corresponding to the determined action, displaying one or more control elements associated with the action, and/or displaying other visual indications.

At block 360, the system determines whether additional audio data corresponding to an additional spoken utterance is received via the microphone(s) of the computing device of the user. The additional audio data corresponding to the additional spoken utterance may be received responsive to causing the computing device of the user or the additional computing device of the user to render the indication of the action to be performed by the automated assistant. In implementations where a respective confidence level associated with the given speech hypothesis (e.g., the transcription hypothesis and/or term hypotheses thereof) associated with the action to be performed fail to satisfy a threshold confidence level, one or more components of the computing device of the user may be kept active in anticipation of receiving the additional audio data. For example, speech recognition may be kept active such that the user need not include a trigger term or phrase in the additional spoken utterance to activate speech recognition. As another example, word detection may be kept active such that a word detection model is utilized to determine whether a specific term or phrase is included in the additional audio data (e.g., correction term(s) or phrase(s), different speech hypotheses, and/or other term(s) or phrase(s)). In implementations where a respective confidence level associated with the given speech hypothesis (e.g., the transcription hypothesis and/or term hypotheses thereof) associated with the action to be performed satisfies the threshold confidence level, one or more components of the computing device of the user may be deactivated. For example, speech recognition may be deactivated such that the user may need to include a trigger term or phrase in the additional spoken utterance to activate speech recognition. If, at an iteration of block 360, the system determines no additional audio data corresponding to an additional spoken utterance is received, then the system may proceed to block 368. Block 368 is described in detail below. If, at an iteration of block 360, the system determines that additional audio data corresponding to an additional spoken utterance is received, then the system may proceed to block 362.

At block 362, the system processes the additional audio data corresponding to the additional spoken utterance. In some implementations, the system can analyze acoustic features of the additional spoken utterance, a waveform of the additional spoken utterance, and/or other audio-based representations of the additional audio data. In some additional and/or alternative versions of those implementations, the system can process, using the speech recognition model(s), the additional audio data to generate a plurality of additional speech hypotheses (e.g., additional transcription hypotheses and/or additional term hypotheses). The plurality of additional speech hypotheses may be restricted to those that overlap with the prior speech hypotheses considered in processing the additional audio data, and can optionally omit the given speech hypotheses selected as corresponding to the prior spoken utterance received at block 352.

At block 364, the system determines whether at least a portion of the spoken utterance is similar to at least an additional portion of the additional spoken utterance. In some implementations, the system can compare acoustic features, of the audio data corresponding to the spoken utterance, to additional acoustic features, of the additional audio data corresponding to the additional spoken utterance. For example, the system can compare the waveforms of the spoken utterance and the additional spoken utterance, MFCCs of the spoken utterance and the additional spoken utterance, mel filterbank features of the of the spoken utterance and the additional spoken utterance, and/or other of the spoken utterance and the additional spoken utterance. In some additional and/or alternative implementations, the system can compare a transcription corresponding to the spoken utterance to an additional transcription corresponding to the additional spoken utterance. The additional transcription may be generated based on an additional given transcription hypothesis of the plurality of additional transcription hypotheses.

Figure 4:
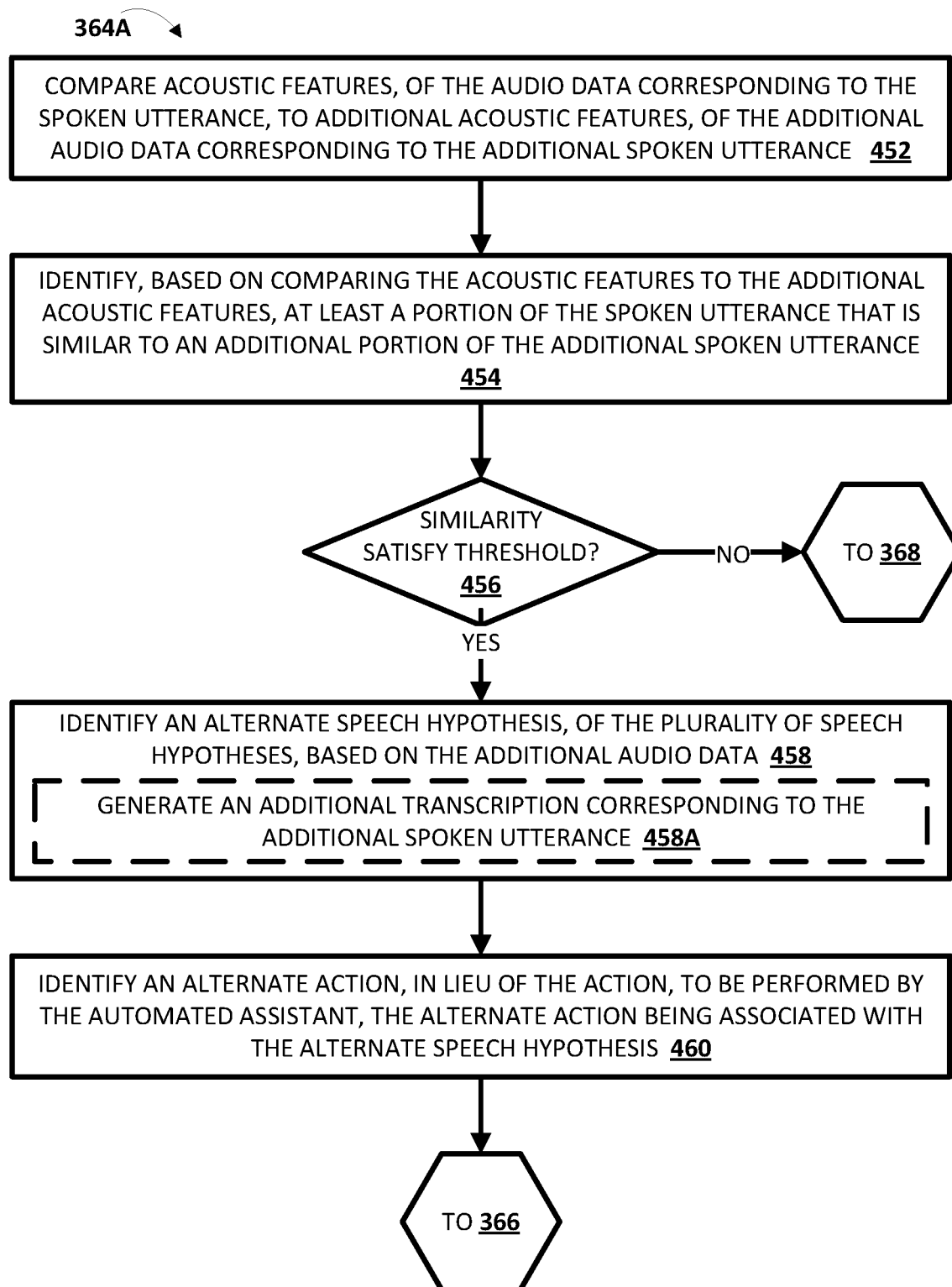
FIG. 4 is a flowchart illustrating an example method of determining similarity between at least a portion of a spoken utterance and at least an additional portion of an additional spoken utterance for the method of FIG. 3, in accordance with various implementations.

For example, and referring now to FIG. 4, a flowchart illustrating an example method 364A of determining similarity between at least a portion of the spoken utterance and at least an additional portion of the additional spoken utterance for the method of FIG. 3 is depicted. At block 452, the system compares acoustic features, of the audio data corresponding to the spoken utterance, to additional acoustic features, of the additional audio data corresponding to the additional spoken utterance. At block 454, the system identifies, based on comparing the acoustic features to the additional acoustic features, at least a portion of the spoken utterance that is similar to an additional portion of the additional spoken utterance. For instance, assume the original spoken utterance included the term "Doe", and assume speech recognition misrecognized "Doe" as "Roe". Further assume the additional spoken utterance included the term "Doe" again. In these instances, the acoustic features indicate that the portion of the original spoken utterance corresponding to "Doe" is similar to the portion of the additional spoken utterance corresponding to "Doe".

At block 456, the system determines whether the similarity between the portion of the spoken utterance that is similar to the additional portion of the additional spoken utterance satisfies a similarity threshold. If, at an iteration of block 456, the system determines the similarity between the portion of the spoken utterance that is similar to the additional portion of the additional spoken utterance fails to satisfy the similarity threshold, then the system may proceed to block 368. Block 368 is described in detail below. Notably, the additional spoken utterance may correct an action to be performed by the automated assistant, but the correction may not be due to a misrecognition. For instance, assume the original spoken utterance included the term "Doe", and assume speech recognition misrecognized "Doe" as "Roe". Further assume the additional spoken utterance included the term "Smith" instead of "Doe" again. In these instances, the acoustic features may not indicate that the portion of the original spoken utterance corresponding to "Doe" is similar to the portion of the additional spoken utterance corresponding to "Smith". Further, a distinct action may be performed by the automated assistant based on the additional audio data, but the distinct action is not an alternate action in that it is very unlikely a term hypothesis for "Smith" or transcription hypothesis including the term hypothesis "Smith" was generated in originally processing the portion of the spoken utterance corresponding to "Doe". If, at an iteration of block 456, the system determines the similarity between the portion of the spoken utterance that is similar to the additional portion of the additional spoken utterance satisfies the similarity threshold, then the system may proceed to block 458.

At block 458, the system identifies an alternate speech hypothesis, of the plurality of speech hypotheses, based on the additional audio data. The alternate speech hypothesis may include an alternate transcription hypothesis and/or alternate term hypotheses generated based on processing the additional audio data using the speech recognition model(s). Further, the alternate speech hypothesis may be a given additional speech hypothesis, of the plurality of additional speech hypotheses, that overlaps with the original plurality of speech hypotheses. In some implementations, block 458 may include optional sub-block 458A. If included, at sub-block 458A, the system may generate an additional transcription corresponding to the additional spoken utterance. The additional transcription may be based on the alternate speech hypothesis, and optionally the original speech hypothesis. For example, the additional transcription may be based on an alternate transcription hypothesis, a plurality of alternate term hypotheses, and/or an alternate term hypothesis and the original transcription hypothesis.

At block 460, the system identifies an alternate action, in lieu of the action, to be performed by the automated assistant, the alternate action being associated with the alternate speech hypothesis. The alternate action can include an alternate intent determined based on the additional spoken utterance and/or alternate slot value(s) determined based on the additional spoken utterance. For example, assume the original spoken utterance included the term "Doe" as a slot value for a parameter, and assume speech recognition misrecognized "Doe" as "Roe". Further assume the additional spoken utterance included the term "Doe" again. In these instances, the alternate slot value "Doe" can be identified as part of the alternate action (instead of "Roe"). The system may proceed to block 366.

Returning back to FIG. 3, at block 366, the system supplants the action with an alternate action to be performed by the automated assistant. Continuing with the above example, the slot value of "Doe" can supplant the slot value of "Roe", resulting in the alternate action taking place of the action, such that the automated assistant will perform the alternate action rather than the original action.

At block 368, the system causes the automated assistant to initiate performance of the action, the alternate action, and/or the distinct action. In implementations where no additional spoken utterance is received (e.g., "NO" branch from block 360), the system can cause the automated assistant to initiate performance of the action determined based on the original spoken utterance. In implementations where the additional spoken utterance is received and the additional spoken utterance corrects a misrecognition (e.g., form block 366), then the system can cause the automated assistant to initiate performance of the alternate action. In implementations where the additional spoken utterance is received but the additional spoken utterance modifies the action without correcting a misrecognition (e.g., from block 364), then the system can cause the automated assistant to initiate performance of the distinct action. In some implementations, block 368 may include optional sub-block 368A. If included, at sub-block 368A, the system may bias processing of further spoken utterances based on the supplanting. For example, the system may cause speech recognition to be biased towards terms that were misrecognized and/or biased away from the incorrect term for the remainder of the dialog session and/or during subsequent dialog sessions.

Figure 5:
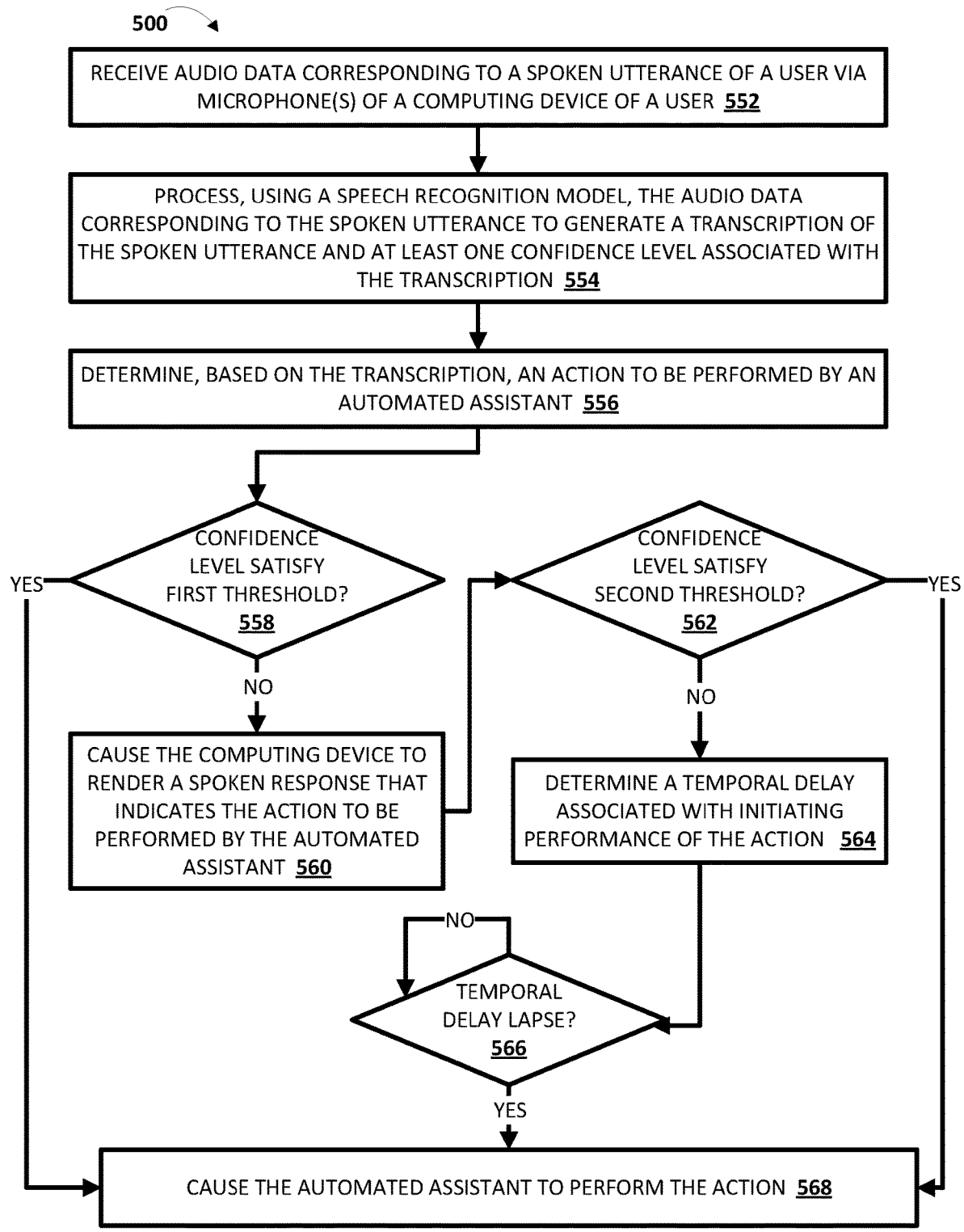
FIG. 5 is a flowchart illustrating an example method of determining whether to render a spoken response that indicates an action to be performed by an automated assistant, and determining when to initiate performance of the action by the automated assistant, in accordance with various implementations.

Turning now to FIG. 5, a flowchart illustrating example method 400 of determining whether to render a spoken response that indicates an action to be performed by an automated assistant, and determining when to initiate performance of the action by the automated assistant is depicted. For convenience, the operations of the method 400 are described with reference to a system that performs the operations. The system of the method 400 includes one or more processors and/or other component(s) of a computing device. For example, the system of the method 300 can be client device 110 of FIG. 1, client device 610 of FIGS. 6A-6C, computing device 710 of FIG. 7, one or more servers, other computing devices, and/or any combination thereof. Moreover, while operations of the method 400 are shown in a particular order, this is not meant to be limiting. One or more operations may be reordered, omitted, and/or added.

At block 552, the system receives audio data corresponding to a spoken utterance of a user via microphone(s) of a computing device of a user (e.g., "Play a song by John Doe", "Turn on the bedroom lights", etc.). At block 554, the system processes, using a speech recognition model, the audio data corresponding to the spoken utterance to generate a transcription of the spoken utterance and at least one confidence level associated with the transcription. The system can generate a plurality of speech hypotheses ( ) based on output generated using the speech recognition model. The plurality of speech hypotheses can include, for example, term hypotheses for each term included in the spoken utterance (e.g., "Doe", "Roe", "Row", "Dough", etc.) and/or transcription hypotheses that include various combinations of the term hypotheses (e.g., "Play a song by John Doe", "Play a song by John Roe", and so on). Each of the plurality of speech hypotheses may be associated with a respective confidence level. For example, each term hypothesis and/or transcription hypothesis may be associated with a respective confidence level. In various implementations, the transcription of the spoken utterance corresponds to the transcription hypothesis having the highest confidence level.

At block 556, the system determines, based on the transcription, an action to be performed by an automated assistant. The action can include, for example, an intent included in the spoken utterance, and one or more slot values for one or more parameters associated with the intent. For example, assume a spoken utterance of "Play a song by John Doe" is received at the computing device of the user, but the transcription hypothesis (and the corresponding transcription) of "Play a song by John Roe" (including term hypothesis "Roe" instead of "Doe" as intended by the user) is associated with the highest confidence level. In this example, the action may include the intent of "Play a song" (e.g., represented by term hypotheses "Play", "a", "song") and a slot value of "John Doe" for an "artist" parameter (e.g., represented by term hypotheses "John", "Doe").

At block 558, the system determines whether the at least one confidence level associated with the transcription satisfies a first threshold confidence level. If, at an iteration of block 558, the system determines the at least one confidence level associated with the transcription satisfies the first threshold confidence level, then the system may proceed to block 568. In implementations where the system proceeds to block 568 from the "YES" branch of block 558, at block 568, the system can cause the automated assistant to fully perform the action without causing the automated assistant to render a spoken response that indicates the action to be performed. In other words, if the system is highly confident the transcription corresponds to the spoken utterance, then the system can cause the automated assistant to fully perform the action without repeating the action to the user. For example, assume a spoken utterance of "Turn on the kitchen lights" is received at the computing device of the user, and the transcription hypothesis (and the corresponding transcription) of "Turn on the kitchen lights" is associated with a highest respective confidence level that satisfies the first threshold confidence level. In this example, the system can cause the automated assistant to establish a connection with the kitchen lights, generate a request for the kitchen lights to transition to an "on" state, and transmit the request to the kitchen lights without rendering any spoken response. If, at an iteration of block 558, the system determines the at least one confidence level associated with the transcription fails to satisfy the first threshold confidence level, then the system may proceed to block 560.

At block 560, the system causes the computing device to render a spoken response that indicates the action to be performed by the automated assistant. For example, assume a spoken utterance of "Play a song by John Doe" is received at the computing device of the user, and the transcription hypothesis (and the corresponding transcription) of "Play a song by John Doe" is associated with a highest respective confidence level that fails to satisfy the first threshold confidence level. In this example, the system can cause the automated assistant to render the spoken response of "Okay, playing a song by John Doe" to enable the user an opportunity to correct any potential misrecognitions.

At block 562, the system determines whether the at least one confidence level associated with the transcription satisfies a second threshold confidence level. If, at an iteration of block 562, the system determines the at least one confidence level associated with the transcription satisfies the second threshold confidence level, then the system may proceed to block 568. In implementations where the system proceeds to block 568 from the "YES" branch of block 562, at block 568, the system can cause the automated assistant to initiate performance of the action subsequent to rendering the spoken response that indicates the action to be performed. Continuing with the above example, assume the transcription hypothesis (and the corresponding transcription) of "Play a song by John Doe" is associated with a highest respective confidence level that fails to satisfy the first threshold confidence level, but satisfies the second threshold confidence level. In this example, the system can cause the automated assistant to establish a connection with a music streaming service, generate a request for a "song" by "John Doe", and send the request to the music streaming service for the "song" by "John Doe" subsequent to rendering the spoken response. However, the music may only be buffered without playing until it is determined that the user does not correct a possible misrecognition. If, at an iteration of block 562, the system determines the at least one confidence level associated with the transcription fails to satisfy the second threshold confidence level, then the system may proceed to block 564.

At block 564, the system determines a temporal delay associated with initiating performance of the action. In some implementations, the temporal delay can be pre-defined (e.g., one second, two seconds, three seconds, and so on). In some additional and/or alternative implementations, the temporal delay can be based on the respective confidence level associated with the transcription speech hypothesis. For example, if the respective confidence level is within a threshold range of the second threshold confidence level, then the temporal delay may be a first duration. However, if the respective confidence level is not within the threshold range of the second threshold confidence level, then the temporal delay may be a second duration that is longer than the first duration. In various implementations, the system can cause the automated assistant to establish a connection with a service associated with the intent of the action and generate a request to transmit to the service, but withhold sending of the request.

At block 566, the system determines whether the temporal delay associated with initiating performance of the action has lapsed. If, at an iteration of block 566, the system determines the temporal delay has not lapsed, then the system may continually monitor for lapse of the temporal delay at block 566. If, at an iteration of block 566, the system determines the temporal delay has lapsed, then the system may proceed to block 568. At block 568, the system causes the automated assistant to initiate performance of the action. In implementations where the system proceeds to block 568 from the "YES" branch of block 566, at block 568, the system can cause the automated assistant to send the request that was previously withheld.

In various implementations, the system may receive additional audio data. In these implementations of the method 500 of FIG. 5, the system may utilize the methods 300 and 364A of FIGS. 3 and 4 to determine whether the additional audio data corrects a misrecognition, and, if so, how to determine the alternate action that corrects the misrecognition.

Figure 6A:
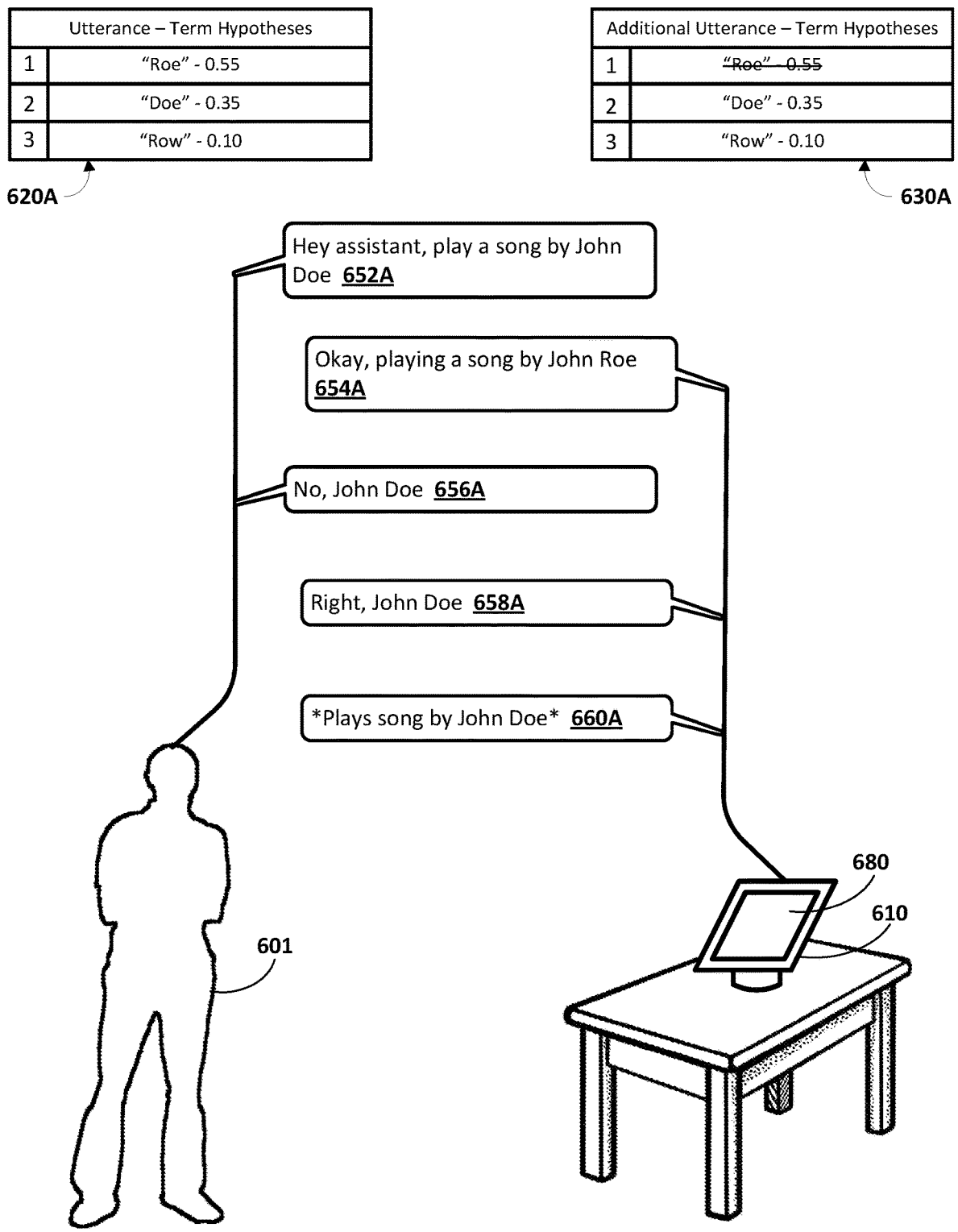
FIGS. 6A, 6B, and 6C various non-limiting examples of dialog sessions between a user of a computing device and an automated assistant accessible at the computing device, in accordance with various implementations.
Figure 6B:
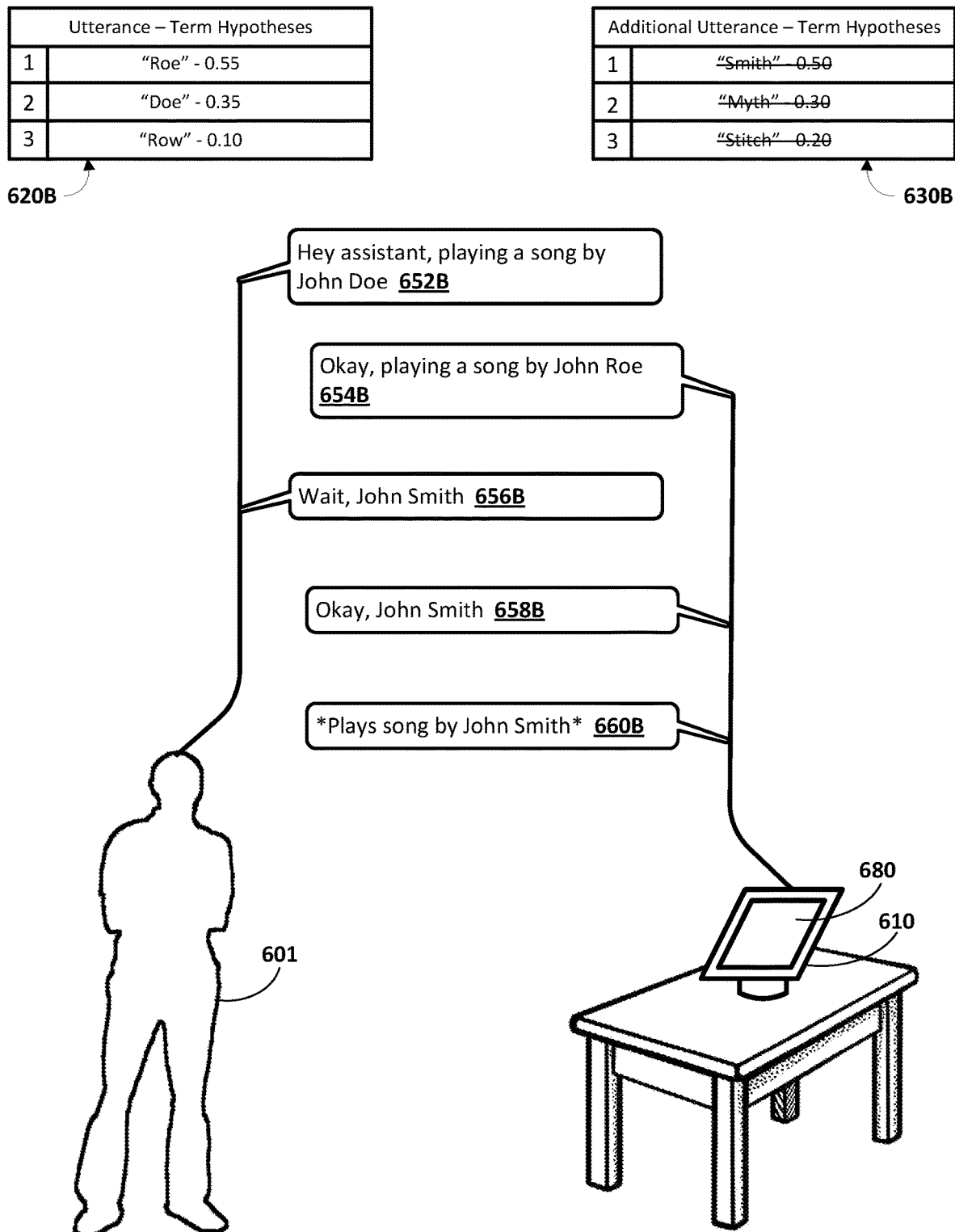
Figure 6C:
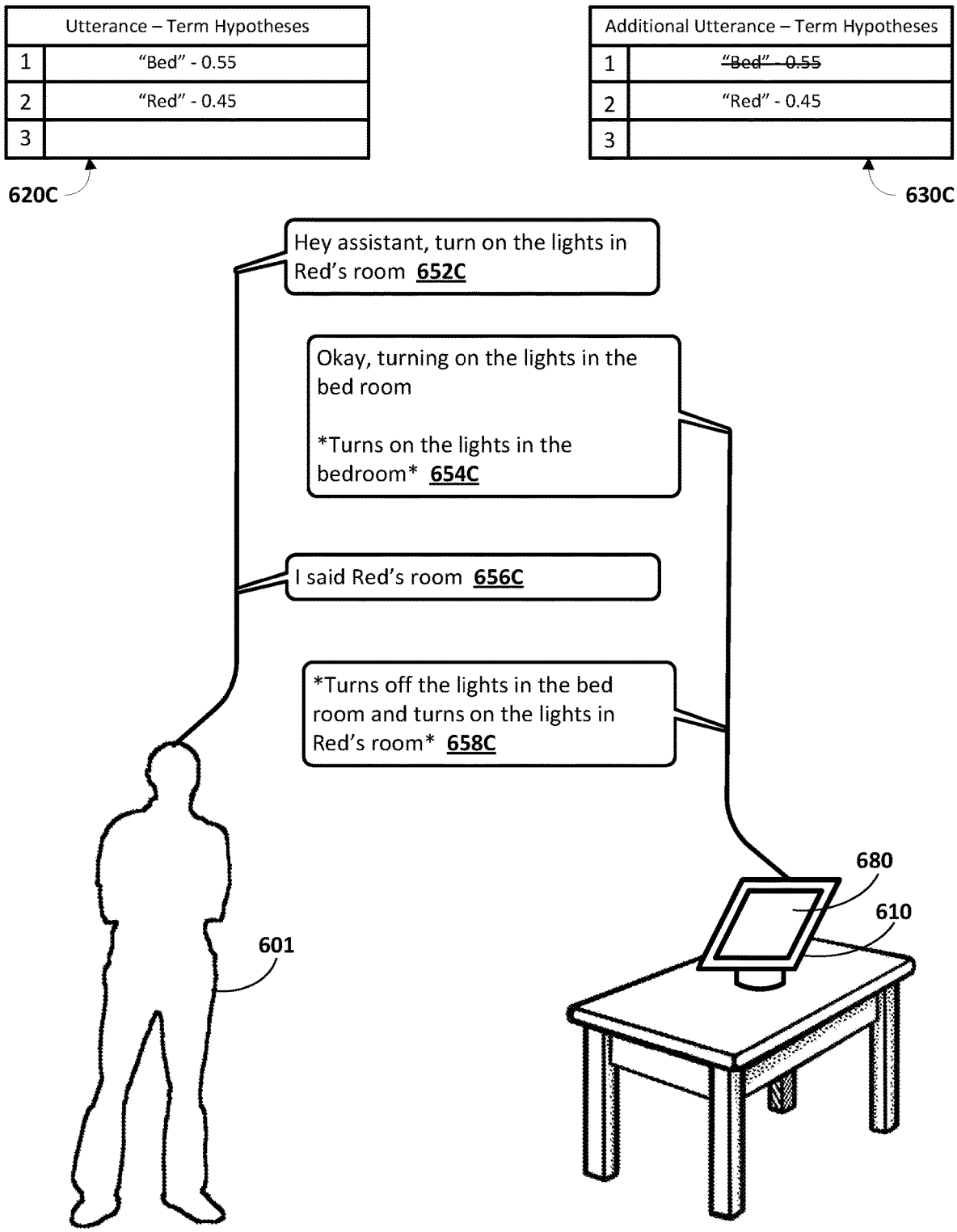

Turning now to FIGS. 6A, 6B, and 6C, various non-limiting examples of dialog sessions between a user 601 of a computing device 610 and an automated assistant accessible at the computing device 610 are depicted. The automated assistant can implement a system locally at the computing device 610 and/or remotely at one or more servers in communication with the computing device 610 over network(s) (e.g., network(s) 190 of FIG. 1) to identify and/or correct misrecognitions (e.g., speech misrecognition system 160 of FIG. 1). The computing device 610 may include microphone(s) to generate audio data based on spoken utterances and/or other audible input, speaker(s) to audibly render synthesized speech and/or other audible output, and/or a display 680 to visually render transcriptions and/or other visual output. Although the computing device 610 depicted in FIGS. 6A, 6B, and 6C is a standalone computing device having a display, it should be understood that is for the sake of example and is not meant to be limiting. For example, the computing device 610 may be a mobile device, a standalone speaker without a display, a home automation device, a vehicular system, a laptop, a computer, and/or any other device capable of engaging in a human-to-computer dialog session with the user 601.

Referring specifically to FIG. 6A, assume the computing device 610 receives a spoken utterance 652A of "Hey assistant, play a song by John Doe" from the user 601. The automated assistant can cause the computing device 610 (and/or a remote system) to process, using speech recognition model(s), audio data that corresponds to the spoken utterance to generate a plurality of speech hypotheses and respective confidence levels associated with each of the plurality of speech hypotheses. The plurality of speech hypotheses can include, for example, transcription hypotheses and/or term hypotheses. For example, assume the automated assistant is highly confident in term hypotheses corresponding to "play", "a", "song", "by", and "John". However, further assume the automated assistant is not confident in a term hypothesis corresponding to "Doe". For instance, table 620A includes a table of term hypotheses corresponding to "Doe" for the spoken utterance, and respective confidence level associated with each of the term hypotheses corresponding to "Doe". The table 620A includes a first term hypothesis of "Roe" associated with a first probability of 0.55, a second term hypothesis of "Doe" associated with a second probability of 0.35, and a third term hypothesis of "Row" associated with a third probability of 0.10. This may result in corresponding transcription hypotheses of "play a song by John Roe" that is associated with the first probability, "play a song by John Doe" that is associated with the second probability, and "play a song by John Row" that is associated with the third probability. Although particular term hypotheses are depicted in the table 620A as being associated with particular probabilities, it should be understood that the table 620A is provided for the sake of example and is not meant to be limiting.

Further assume that the automated assistant determines, based on the respective confidence levels associated with each of the plurality of term hypotheses, that "Doe" in the spoken utterance 652A corresponds to the term hypothesis "Roe" as indicated by the table 620A. As a result, an action to be performed includes an intent of "play music", a slot value of "John Roe" for an "artist" parameter (and optionally a particular song for a "song" parameter if specified). The action can be associated with a given speech hypothesis one the plurality of speech hypotheses. Notably, the automated assistant incorrectly determined the slot value of "John Roe" for the "artist" parameter even though the user 601 intended the slot value of "John Doe". In various implementations, the automated assistant can render an indication of the action to be performed at the computing device 610. For example, in response to receiving the spoken utterance 652A, the automated assistant can cause the computing device 610 to audibly render a spoken response 654A of "Okay, playing a song by John Roe". The automated assistant can optionally cause the computing device to visually render a transcription corresponding to the spoken response 654A via the display 680.

In some implementations, the computing device 610 may receive an additional spoken utterance. In some versions of those implementations, the additional spoken utterance may correct a misrecognition in processing of the original spoken utterance 652A. The automated assistant can identify the misrecognition based on processing the additional spoken utterance 656A. For example, assume the additional spoken utterance 656A is received at the computing device 610 in response to the computing device 610 audibly rendering the spoken response 654A. In this example, the automated assistant can process acoustic features and/or textual features of the additional spoken utterance 656A to determine whether a portion of the additional spoken utterance 656A is intended to correct a portion of the interpretation of the spoken utterance 652A. For instance, the automated assistant can process the additional spoken utterance 656A to determine that "John Doe" from the additional spoken utterance 656A is acoustically similar to "John Doe" from the original spoken utterance 652A. As another example, the automated assistant can identify correction terms or phrases included in the spoken utterance (e.g. "No", "I said", "What I said is", and/or other terms that are indicative of the misrecognition). In response to determining that the additional spoken utterance corrects the misrecognition, the automated assistant can cause the original action to be cancelled if initiated and/or being performed (e.g., stop playing the song by John Roe if it had started). In some implementations, the automated assistant may keep component(s) of the computing device 610 active based on the confidence level associated with the given speech hypothesis that is selected as corresponding to the spoken utterance 652A, whereas in other implementations, the automated assistant may deactivate the component(s) of the computing device 610 based on the confidence level. The component(s) can include, for example, hotword recognition, speech recognition, NLU, fulfillment, and/or other components of the computing device 610.

Further, the automated assistant can process, using the speech recognition model(s), additional audio data corresponding to the additional spoken utterance 656A to generate a plurality of additional speech hypotheses. The plurality of additional speech hypotheses can be restricted to those that overlap with the original plurality of speech hypotheses generated in processing the spoken utterance 652A, and optionally omit the given speech hypothesis, of the plurality of speech hypotheses, that was selected as corresponding to the spoken utterance 652A. For example, assume the automated assistant is highly confident in term hypotheses corresponding to "No" and "John". However, further assume the automated assistant is not confident in a term hypothesis corresponding to "Doe". For instance, table 630A includes a table of term hypotheses corresponding to "Doe" for the spoken utterance, and respective confidence level associated with each of the term hypotheses corresponding to "Doe". Notably, the table 630A includes the same term hypotheses as the table 620A. However, since the automated assistant previously selected the term "Roe" as corresponding to "Doe" based on the term hypotheses in table the table 620A and the automated assistant determined the additional spoken utterance 656A is intended to correct a misrecognition, the automated assistant may select the next term hypothesis with the highest confidence level, such as "Doe".

In these implementations, and with respect to the action, the automated assistant can supplant the slot value of "John Roe" for the artist parameter with an alternate slot value of "John Doe", resulting in an alternate action to be performed by the automated assistant. In some versions of these implementations, the automated assistant can cause the computing device 610 to audibly render a further spoken response 658A of "Right, John Doe" that acknowledges the correction of the misrecognition, and can perform the alternate action as indicated by 660A.

In some additional and/or alternative versions of those implementations, the additional spoken utterance may indicate a distinct action to be performed despite a misrecognition in processing of the original spoken utterance 652A. For example, and referring specifically to FIG. 6B, assume an additional spoken utterance 656B is received at the computing device 610 in response to the computing device 610 audibly rendering the spoken response 654A. However, in contrast with FIG. 6A, assume the additional spoken utterance 656B corresponds to "Wait, John Smith". In this example, the automated assistant can process acoustic features and/or textual features of the additional spoken utterance 656B to determine whether a portion of the additional spoken utterance 656A is intended to correct a portion of the interpretation of the spoken utterance 652B. For instance, the automated assistant can process the additional spoken utterance 656B to determine that "John Smith" from the additional spoken utterance 656B is not acoustically similar to "John Doe" from the original spoken utterance 652B.

Further, the automated assistant can process, using the speech recognition model(s), additional audio data corresponding to the additional spoken utterance 656B to generate a plurality of additional speech hypotheses. The plurality of additional speech hypotheses can be restricted to those that overlap with the original plurality of speech hypotheses generated in processing the spoken utterance 652B, and optionally omit the given speech hypothesis, of the plurality of speech hypotheses, that was selected as corresponding to the spoken utterance 652B. For example, assume the automated assistant is highly confident in term hypotheses corresponding to "Wait" and "John". However, in processing the additional audio data, the automated assistant may not identify any overlapping speech hypotheses from among the plurality of additional speech hypotheses (e.g., as indicated by the strikethrough term hypotheses in table 630B) that overlap with the original plurality of speech hypotheses (e.g., as reproduced in table 620B).

In these implementations, and with respect to the action, the automated assistant can determine a distinct action to be performed by the automated assistant. As shown in FIG. 6B, the automated assistant can still utilize the "play a song" intent from the original spoken utterance 652, but utilize a distinct slot value of "John Smith" for the "artist" parameter. In some versions of these implementations, the automated assistant can cause the computing device 610 to audibly render a further spoken response 658B of "Okay, John Smith" that acknowledges the distinct action, and can perform the distinct action as indicated by 660B.

In various implementations, the automated assistant can bias future speech recognition towards the alternate speech hypothesis, and away from the originally selected speech hypothesis when a misrecognition is corrected. For example, in the dialog of FIG. 6A, if a subsequent spoken utterance is received at the client device 610 (e.g., during the current dialog session and/or during a subsequent dialog session) where "Doe" is a term hypothesis and/or "Roe" is a term hypothesis, then the speech recognition can be biased towards the term hypothesis for "Doe" and/or away from the term hypothesis for "Roe". In contrast, in the dialog of FIG. 6B, if a subsequent spoken utterance is received at the client device 610 (e.g., during the current dialog session and/or during a subsequent dialog session) where "Smith" is a term hypothesis, then the speech recognition may not be biased towards or away from any terms even though there was a misrecognition (e.g., as indicated by "Roe" in the spoken response 654B despite the spoken utterance 652B including "Doe").

Although FIGS. 6A and 6B are described herein with respect to the automated assistant causing actions to be performed via the computing device 610, it should be understood that is for the sake of example and is not meant to be limiting. Moreover, the techniques described herein can be utilized to correct any misrecognitions. For example, referring specifically to FIG. 6C, the techniques described herein can also be utilized to control home automation devices. For instance, assume the computing device 610 receives a spoken utterance 652C of "Hey assistant, turn on the lights in Red's room", where the "lights" are associated with "Red's room" as defined in a device topology of a smart home of the user 601 of the computing device, and where "Red's room" corresponds to a "semantic identifier" parameter associated with an intent of "turn on the lights". Further assume the automated assistant processes the spoken utterance 652C to generate a plurality of speech hypotheses, including the term hypotheses included in the table 620C. In this example, the automated assistant may be highly confident with term hypotheses corresponding to "turn", "on", "the", "lights", and "room". In response, assume the automated assistant selects "bed" over "Red" based on table 620C, and causes the computing device 610 to audibly render a spoken response 654C of "Okay, turning on the lights in the bedroom", and turns on the lights in the bedroom. However, assume the user 601 provides an additional spoken utterance 656C of "I said Red's room" to correct the misrecognition. In response, the automated assistant can turn off the lights that were turned on in the bedroom, and can turn on the lights in Red's room as originally intended by the user 601 based on an alternate action determined based on alternate speech hypothesis of table 630C (e.g., as indicated by 658C).

Figure 7:
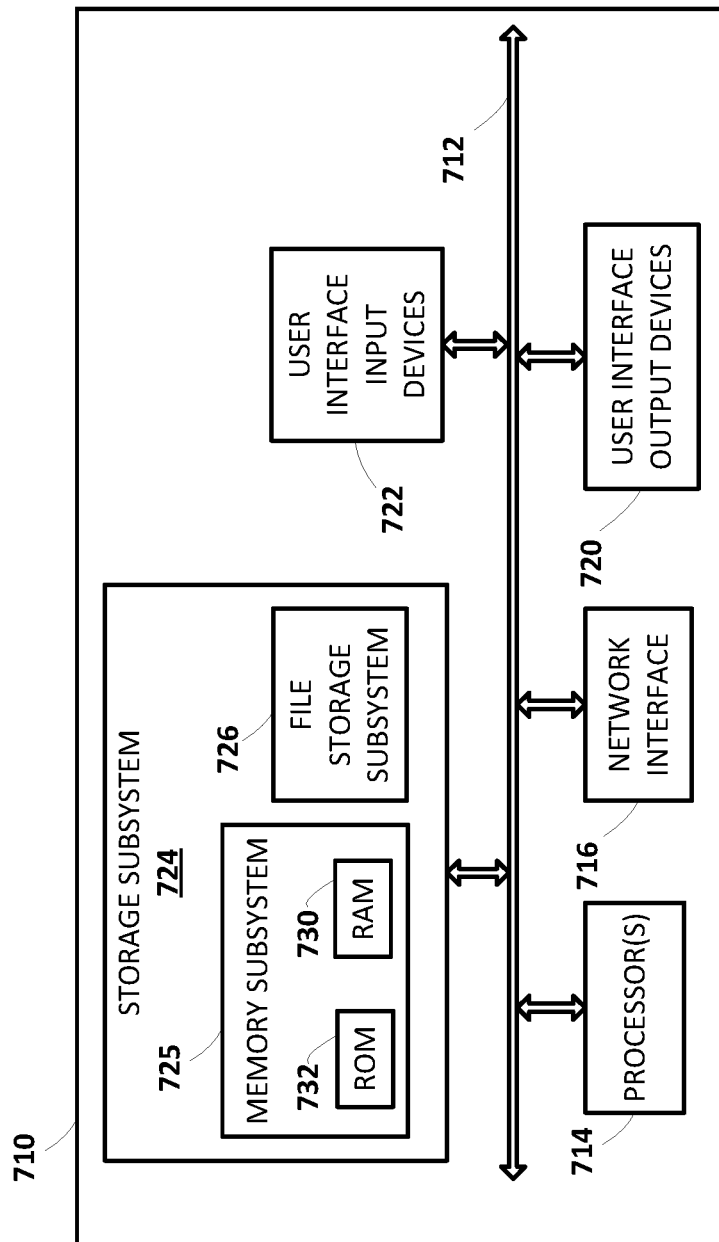
FIG. 7 depicts an example architecture of a computing device, in accordance with various implementations.

Turning now to FIG. 7, is a block diagram of an example computing device 710 that may optionally be utilized to perform one or more aspects of techniques described herein is depicted. In some implementations, one or more of a client device, cloud-based automated assistant component(s), and/or other component(s) may comprise one or more components of the example computing device 710.

Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the methods disclosed herein, as well as to implement various components depicted in FIG. 1.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem 712 may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes receiving audio data corresponding to a spoken utterance of a user, the audio data being generated by one or more microphones of a computing device of the user; processing the audio data corresponding to the spoken utterance to generate a plurality of speech hypotheses; determining, based on the plurality of speech hypotheses, an action to be performed by an automated assistant, the action being associated with a given speech hypothesis of the plurality of speech hypotheses; causing the computing device of the user to render an indication of the action to be performed; in response to the computing device rendering the indication of the action to be performed, receiving additional audio data corresponding to an additional spoken utterance of the user; processing the additional audio data corresponding to the additional spoken utterance to determine that at least a portion of the spoken utterance is similar to an additional portion of the additional spoken utterance; in response to determining that at least the portion of the spoken utterance is similar to the additional portion of the additional spoken utterance, supplanting the action with an alternate action to be performed by the automated assistant, the alternate action being associated with an alternate speech hypothesis of the plurality of speech hypotheses; and causing the automated assistant to initiate performance of the alternate action.

These and other implementations of technology disclosed herein can optionally include one or more of the following features.

In some implementations, processing the additional audio data corresponding to the additional spoken utterance to determine that at least the portion of the spoken utterance is similar to the additional portion of the additional spoken utterance may include comparing acoustic features of the audio data corresponding to the spoken utterance to additional acoustic features of the additional audio data corresponding to the additional spoken utterance; and identifying, based on comparing the acoustic features and the additional acoustic features, at least the portion of the spoken utterance that is similar to the additional portion of the additional spoken utterance.

In some versions of those implementations, the method may further include generating, based on the given speech hypothesis, a transcription corresponding to the spoken utterance, the transcription including at least the portion of the spoken utterance; generating, based on the alternate speech hypothesis, a transcription corresponding to the additional spoken utterance, the additional transcription including at least the additional portion of the additional spoken utterance; comparing the transcription corresponding to the spoken utterance to the additional transcription corresponding to the additional spoken utterance; and identifying, based on comparing the transcription and the additional transcription, the alternate action to be performed by the automated assistant.

In some implementations, the method may further include generating, based on the given speech hypothesis, a transcription corresponding to the spoken utterance, the transcription including at least the portion of the spoken utterance; generating, based on the alternate speech hypothesis, a transcription corresponding to the additional spoken utterance, the additional transcription including at least the additional portion of the additional spoken utterance; comparing the transcription corresponding to the spoken utterance to the additional transcription corresponding to the additional spoken utterance; and identifying, based on comparing the transcription and the additional transcription, the alternate action to be performed by the automated assistant.

In some implementations, the spoken utterance and the additional spoken utterance may be received during a dialog session between the user and the automated assistant, the method may further include one or more of: biasing, during a subsequent dialog session, processing of further additional audio data corresponding to a further additional spoken utterance towards the alternate action; or biasing, during the subsequent dialog session, processing of further additional audio data corresponding to a further additional spoken utterance away from the action.

In some implementations, processing the audio data corresponding to the spoken utterance to generate the speech hypotheses may include determining whether a respective confidence level associated with one or more of the speech hypotheses satisfies a threshold confidence level.

In some versions of those implementations, the method may further include, in response to determining that the respective confidence level associated with one or more of the speech hypotheses fails to satisfy the threshold confidence level: keeping one or more components of the computing device active in anticipation of receiving the additional audio data corresponding to the additional spoken utterance of the user. In some additional and/or alternative versions of those implementations, the method may further include, in response to determining that the confidence level associated with the one or more speech hypotheses satisfies the threshold confidence level: deactivating one or more components of the computing device of the user prior to receiving the additional audio data corresponding to the additional spoken utterance of the user. In yet further versions of those implementations, the additional audio data corresponding to the additional spoken utterance of the user may include a trigger term or phrase to activate the one or more components of the computing device of the user to process the additional audio data corresponding to the additional spoken utterance of the user.

In some versions of those implementations, the method may further include, in response to determining the respective confidence level associated with one or more of the speech hypotheses fails to satisfy the threshold confidence level: determining a temporal delay prior to fully performing the action by the automated assistant. In some further versions of those implementations, the method may further include, prior to lapse of the temporal delay, receiving the additional audio data corresponding to the additional spoken utterance of the user.

In some implementations, the method may further include determining to supplant the action to be performed by the automated assistant to include the alternate action based on the additional audio data corresponding to the additional spoken utterance including a correction term or phrase.

In some implementations, causing the computing device of the user to render the indication of the action to be performed by the automated assistant may include one or more of: causing the computing device of the user to visually render the transcription of the spoken utterance; or causing the computing device of the user to audibly render synthesized speech corresponding to the transcription of the spoken utterance.

In some implementations, a method implemented by one or more processors is provided, and includes receiving audio data corresponding to a spoken utterance of a user, the audio data being generated by one or more microphones of a computing device of the user; processing, using a speech recognition model, the audio data corresponding to the spoken utterance to generate a transcription of the utterance, and at least one confidence level associated with the transcription; determining, based on the transcription, an action to be performed by an automated assistant; when the confidence level associated with the transcription satisfies a threshold confidence level: causing the automated assistant to initiate full performance of the action without rendering, before initiating the full performance of the action, a spoken response that indicates the action to be performed by the automated assistant; and when the respective confidence level associated with the transcription fails to satisfy the threshold confidence level: causing the automated assistant to render a spoken response that indicates the action to be performed by the automated assistant; and causing the automated assistant to fully perform the action subsequent to rendering the spoken response that indicates the action to be performed by the automated assistant.

These and other implementations of technology disclosed herein can optionally include one or more of the following features.

In some implementations, the threshold confidence level is a first threshold confidence level, and the method may further include, when the confidence level associated with the transcription fails to satisfy the first threshold confidence level, and also fails to satisfy a second threshold confidence level: causing the automated assistant to render the spoken response that indicates the action to be performed by the automated assistant; determining a temporal delay associated with initiating performance of the action by the automated assistant; and in response to determining that the temporal delay has lapsed, causing the automated assistant to fully perform the action. In some versions of those implementations, causing the automated assistant to render the spoken response that indicates the action to be performed by the automated assistant and causing the automated assistant to fully perform the action subsequent to rendering the spoken response that indicates the action to be performed by the automated assistant are performed when the confidence level associated with the transcription fails to satisfy the first threshold confidence level, but satisfies the second threshold confidence level.

In some implementations, when the respective confidence level associated with the given speech hypotheses satisfies the threshold confidence level, the method may further include deactivating one or more components of the computing device of the user prior to receiving additional audio data corresponding to an additional spoken utterance of the user. In some versions of those implementations, when the respective confidence level associated with the given speech hypotheses fails to satisfy the threshold confidence level, the method may further include keeping one or more components of the computing device active in anticipation of receiving additional audio data corresponding to the additional spoken utterance of the user.

In some implementations, causing the automated assistant to render the spoken response that indicates the action to be performed by the automated assistant may include causing the computing device of the user to audibly render synthesized speech corresponding to the transcription of the spoken utterance.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

What is claimed is:

1. A method implemented by one or more processors, the method comprising:
   receiving audio data corresponding to a spoken utterance of a user, the audio data being generated by one or more microphones of a computing device of the user;
   processing the audio data corresponding to the spoken utterance to generate a plurality of speech hypotheses;
   determining, based on the plurality of speech hypotheses, an action to be performed by an automated assistant, the action being associated with a given speech hypothesis of the plurality of speech hypotheses;
   causing the computing device of the user to render an indication of the action to be performed;
   in response to the computing device rendering the indication of the action to be performed, receiving additional audio data corresponding to an additional spoken utterance of the user;
   determining, based on processing the additional audio data corresponding to the additional spoken utterance, whether the additional spoken utterance was provided by the user to correct a misrecognition of the spoken utterance in processing the audio data corresponding to the spoken utterance;
   in response to determining that the additional spoken utterance was provided by the user to correct a misrecognition of the spoken utterance in processing the audio data corresponding to the spoken utterance:
      supplanting the action with an alternate action to be performed by the automated assistant, the alternate action being associated with an alternate speech hypothesis of the plurality of speech hypotheses;
      causing the automated assistant to initiate performance of the alternate action; and
      biasing subsequent processing of further additional audio data corresponding to a further additional spoken utterance towards the alternate action; and
   in response to determining that the additional spoken utterance was not provided by the user to correct a misrecognition of the spoken utterance in processing the audio data corresponding to the spoken utterance:
      supplanting the action with a distinct action to be performed by the automated assistant, the distinct action being associated with an additional given speech hypotheses of a plurality of additional speech hypotheses generated based on processing the additional audio data corresponding to the additional spoken utterance of the user;
      causing the automated assistant to initiate performance of the distinct action; and
      refraining from biasing subsequent processing of further additional audio data corresponding to a further additional spoken utterance towards the distinct action.

2. The method of claim 1, wherein determining whether the additional spoken utterance was provided by the user to correct a misrecognition of the spoken utterance in processing the audio data corresponding to the spoken utterance and based on processing the additional audio data corresponding to the additional spoken utterance comprises:
   comparing acoustic features of the audio data corresponding to the spoken utterance to additional acoustic features of the additional audio data corresponding to the additional spoken utterance;
   identifying, based on comparing the acoustic features and the additional acoustic features, at least a portion of the spoken utterance that is similar to an additional portion of the additional spoken utterance; and
   determining, based on at least the portion of the spoken utterance that is similar to the additional portion of the additional spoken utterance, whether the additional spoken utterance was provided by the user to correct a misrecognition on the spoken utterance in processing the audio data corresponding to the spoken utterance.

3. The method of claim 2, further comprising:
   generating, based on the given speech hypothesis, a transcription corresponding to the spoken utterance, the transcription including at least the portion of the spoken utterance;

generating, based on the alternate speech hypothesis, an additional transcription corresponding to the additional spoken utterance, the additional transcription including at least the additional portion of the additional spoken utterance;

comparing the transcription corresponding to the spoken utterance to the additional transcription corresponding to the additional spoken utterance; and identifying, based on comparing the transcription and the additional transcription, the alternate action to be performed by the automated assistant.

4. The method of claim 1, further comprising:

generating, based on the given speech hypothesis, a transcription corresponding to the spoken utterance, the transcription including at least the portion of the spoken utterance;

generating, based on the alternate speech hypothesis, an additional transcription corresponding to the additional spoken utterance, the additional transcription including at least the additional portion of the additional spoken utterance;

comparing the transcription corresponding to the spoken utterance to the additional transcription corresponding to the additional spoken utterance; and identifying, based on comparing the transcription and the additional transcription, the alternate action to be performed by the automated assistant.

5. The method of claim 1, wherein the spoken utterance and the additional spoken utterance are received during a dialog session between the user and the automated assistant, and in response to determining that the additional spoken utterance was provided by the user to correct a misrecognition of the spoken utterance in processing the audio data corresponding to the spoken utterance, the method further comprising:

biasing, during the subsequent dialog session, processing of further additional audio data corresponding to a further additional spoken utterance away from the action.

6. The method of claim 1, wherein processing the audio data corresponding to the spoken utterance to generate the speech hypotheses comprises:

determining whether a respective confidence level associated with one or more of the speech hypotheses satisfies a threshold confidence level.

7. The method of claim 6, further comprising:

in response to determining that the respective confidence level associated with one or more of the speech hypotheses fails to satisfy the threshold confidence level:

keeping one or more components of the computing device active in anticipation of receiving the additional audio data corresponding to the additional spoken utterance of the user.

8. The method of claim 6, further comprising:

in response to determining that the confidence level associated with the one or more speech hypotheses satisfies the threshold confidence level:

deactivating one or more components of the computing device of the user prior to receiving the additional audio data corresponding to the additional spoken utterance of the user.

9. The method of claim 8, wherein the additional audio data corresponding to the additional spoken utterance of the user includes a trigger term or phrase to activate the one or more components of the computing device of the user to process the additional audio data corresponding to the additional spoken utterance of the user.

10. The method of claim 6, further comprising:

in response to determining the respective confidence level associated with one or more of the speech hypotheses fails to satisfy the threshold confidence level:

determining a temporal delay prior to fully performing the action by the automated assistant.

11. The method of claim 10, further comprising:

prior to lapse of the temporal delay, receiving the additional audio data corresponding to the additional spoken utterance of the user.

12. The method of claim 1, further comprising:

determining to supplant the action to be performed by the automated assistant to include the alternate action based on the additional audio data corresponding to the additional spoken utterance including a correction term or phrase.

13. The method of claim 1, wherein causing the computing device of the user to render the indication of the action to be performed by the automated assistant comprises one or more of:

causing the computing device of the user to visually render a transcription of the spoken utterance; or causing the computing device of the user to audibly render synthesized speech corresponding to the transcription of the spoken utterance.

14. A method implemented by one or more processors, the method comprising:

receiving audio data corresponding to a spoken utterance of a user, the audio data being generated by one or more microphones of a computing device of the user;

processing, using a speech recognition model, the audio data corresponding to the spoken utterance to generate a transcription of the utterance, and respective confidence level associated with the transcription;

determining, based on the transcription, an action to be performed by an automated assistant;

when the respective confidence level associated with the transcription satisfies a first threshold confidence level:

causing the automated assistant to initiate full performance of the action without rendering, before initiating the full performance of the action, a spoken response that indicates the action to be performed by the automated assistant; and deactivating one or more components of the computing device of the user prior to receiving additional audio data corresponding to an additional spoken utterance of the user;

when the respective confidence level associated with the transcription fails to satisfy the first threshold confidence level, but when the respective confidence level associated with the transcription satisfies a second threshold confidence level:

causing the automated assistant to render a spoken response that indicates the action to be performed by the automated assistant;

keeping one or more of the components of the computing device active in anticipation of receiving additional audio data corresponding to the additional spoken utterance of the user; and causing the automated assistant to fully perform the action subsequent to rendering the spoken response that indicates the action to be performed by the automated assistant; and when the respective confidence level associated with the transcription fails to satisfy the first threshold confidence level, and when the respective confidence level associated with the transcription fails to satisfy the second threshold confidence level:
  causing the automated assistant to render the spoken response that indicates the action to be performed by the automated assistant;
  keeping one or more of the components of the computing device active in anticipation of receiving the additional audio data corresponding to the additional spoken utterance of the user;
  determining a temporal delay associated with initiating performance of the action by the automated assistant; and
  in response to determining that the temporal delay has lapsed, causing the automated assistant to fully perform the action.

15. The method of claim 14, wherein causing the automated assistant to render the spoken response that indicates the action to be performed by the automated assistant comprises:
  causing the computing device of the user to audibly render synthesized speech corresponding to the transcription of the spoken utterance.

16. The method of claim 14, when the respective confidence level associated with the transcription fails to satisfy the first threshold confidence level, but when the respective confidence level associated with the transcription satisfies the second threshold confidence level, the method further comprising:
  determining a first temporal delay associated with initiating performance of the action by the automated assistant; and
  in response to determining that the first temporal delay has lapsed, causing the automated assistant to fully perform the action.

17. The method of claim 16, wherein the temporal delay is a second temporal delay, wherein the first temporal delay is a first duration of time, wherein the second temporal delay is a second duration of time, and wherein the second duration of time is longer than the first duration of time.

18. The method of claim 14, wherein the action to be performed by the automated assistant includes a request to establish communication with a third-party service, and when the respective confidence level associated with the transcription fails to satisfy the first threshold confidence level, and when the respective confidence level associated with the transcription fails to satisfy the second threshold confidence level, the method further comprising:
  prior to determining that the temporal delay has lapsed, refraining from establishing communication with the third-party service.

19. The method of claim 18, in response to determining that the temporal delay has lapsed, the method further comprising:
  establishing communication with the third-party service.

20. A system comprising:
at least one processor; and
at least one memory storing instructions that, when executed, cause the at least one processor to:
  receive audio data corresponding to a spoken utterance of a user, the audio data being generated by one or more microphones of a computing device of the user;
  process the audio data corresponding to the spoken utterance to generate a plurality of speech hypotheses;
  determine, based on the plurality of speech hypotheses, an action to be performed by an automated assistant, the action being associated with a given speech hypothesis of the plurality of speech hypotheses;
  cause the computing device of the user to render an indication of the action to be performed;
  in response to the computing device rendering the indication of the action to be performed, receive additional audio data corresponding to an additional spoken utterance of the user;
  determine, based on processing the additional audio data corresponding to the additional spoken utterance, whether the additional spoken utterance was provided by the user to correct a misrecognition of the spoken utterance in processing the audio data corresponding to the spoken utterance;
  in response to determining that the additional spoken utterance was provided by the user to correct a misrecognition of the spoken utterance in processing the audio data corresponding to the spoken utterance:
    supplant the action with an alternate action to be performed by the automated assistant, the alternate action being associated with an alternate speech hypothesis of the plurality of speech hypotheses;
    cause the automated assistant to initiate performance of the alternate action; and
    bias subsequent processing of further additional audio data corresponding to a further additional spoken utterance towards the alternate action; and
  in response to determining that the additional spoken utterance was not provided by the user to correct a misrecognition of the spoken utterance in processing the audio data corresponding to the spoken utterance:
    supplant the action with a distinct action to be performed by the automated assistant, the distinct action being associated with an additional given speech hypotheses of a plurality of additional speech hypotheses generated based on processing the additional audio data corresponding to the additional spoken utterance of the user;
    cause the automated assistant to initiate performance of the distinct action; and
    refrain from biasing subsequent processing of further additional audio data corresponding to a further additional spoken utterance towards the distinct action.

* * * * *